(12) United States Patent
Uesaki et al.

(10) Patent No.: US 7,015,917 B2
(45) Date of Patent: Mar. 21, 2006

(54) CURVED SURFACE SUBDIVISION APPARATUS

(75) Inventors: Akira Uesaki, Takatsuki (JP); Tadashi Kobayashi, Ibaraki (JP); Kazutaka Nishio, Ibaraki (JP); Akio Nishimura, Sakai (JP); Yoshiyuki Mochizuki, Suita (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/883,765

(22) Filed: Jul. 6, 2004

(65) Prior Publication Data

US 2005/0012750 A1  Jan. 20, 2005

(30) Foreign Application Priority Data

Jul. 18, 2003 (JP) .............................. 2003-276840

(51) Int. Cl.
*G09G 5/39* (2006.01)
*G06T 15/40* (2006.01)
(52) U.S. Cl. .................... 345/531; 345/442; 345/565
(58) Field of Classification Search ................ 345/531, 345/442, 565, 441, 418, 467, 468, 469, 530, 345/564
See application file for complete search history.

(56) References Cited

U.S. PATENT DOCUMENTS

| 4,803,477 | A | * | 2/1989 | Miyatake et al. | ........... 345/565 |
| 5,269,000 | A | * | 12/1993 | Ohuchi | ................. 345/442 |
| 5,408,598 | A | * | 4/1995 | Pryor, Jr. | .................... 345/442 |
| 5,900,884 | A | * | 5/1999 | Minami et al. | ............. 345/442 |
| 6,583,788 | B1 | * | 6/2003 | Ali-Santosa | ................. 345/443 |

FOREIGN PATENT DOCUMENTS

JP        2001-331812        11/2001

* cited by examiner

*Primary Examiner*—Kee M. Tung
*Assistant Examiner*—Joni Hsu
(74) *Attorney, Agent, or Firm*—Wenderoth, Lind & Ponack, L.L.P.

(57) ABSTRACT

A subdivision level determination unit (13) in a curved surface subdivision apparatus (10) accepts an input of information about control points that define a shape of a curved surface and determines the subdivision level for the surface. Next, it sets, for a subdivision processing operation control unit (16), a control table corresponding to the determined subdivision level. The subdivision processing operation control unit (16) executes the subdivision processing while controlling a work memory unit (14) and a subdivision processing operation unit (15) based on the set control table.

16 Claims, 22 Drawing Sheets

FIG. 5

| Distance from viewpoint L | Subdivision level |
|---|---|
| $0 <= L < ML_0$ | 0 |
| $ML_0 <= L < ML_1$ | 1 |
| $ML_1 <= L < ML_2$ | 2 |
| $ML_2 <= L < ML_3$ | 3 |
| $ML_3 <= L < ML_4$ | 4 |
| $ML_4 <= L$ | 5 |

FIG. 8

| INPUT | | | | OUTPUT | | | | |
|---|---|---|---|---|---|---|---|---|
| i | j | k | D | i | j | k | D | |
| 0 | 0 | 0 | j | 0 | 0 | 0 | j | S10 |
| 0 | 0 | 1 | j | 0 | 0 | 1 | j | |
| 0 | 0 | 2 | j | 0 | 0 | 2 | j | |
| 0 | 0 | 3 | j | 0 | 0 | 3 | j | 20 |
| 0 | 0 | 0 | j | 1 | 0 | 0 | j | |
| 0 | 0 | 1 | j | 1 | 0 | 1 | j | |
| 0 | 0 | 2 | j | 1 | 0 | 2 | j | |
| 0 | 0 | 3 | j | 1 | 0 | 3 | j | |
| 1 | 0 | 0 | k | 1 | 0 | 0 | k | S11 |

⋮

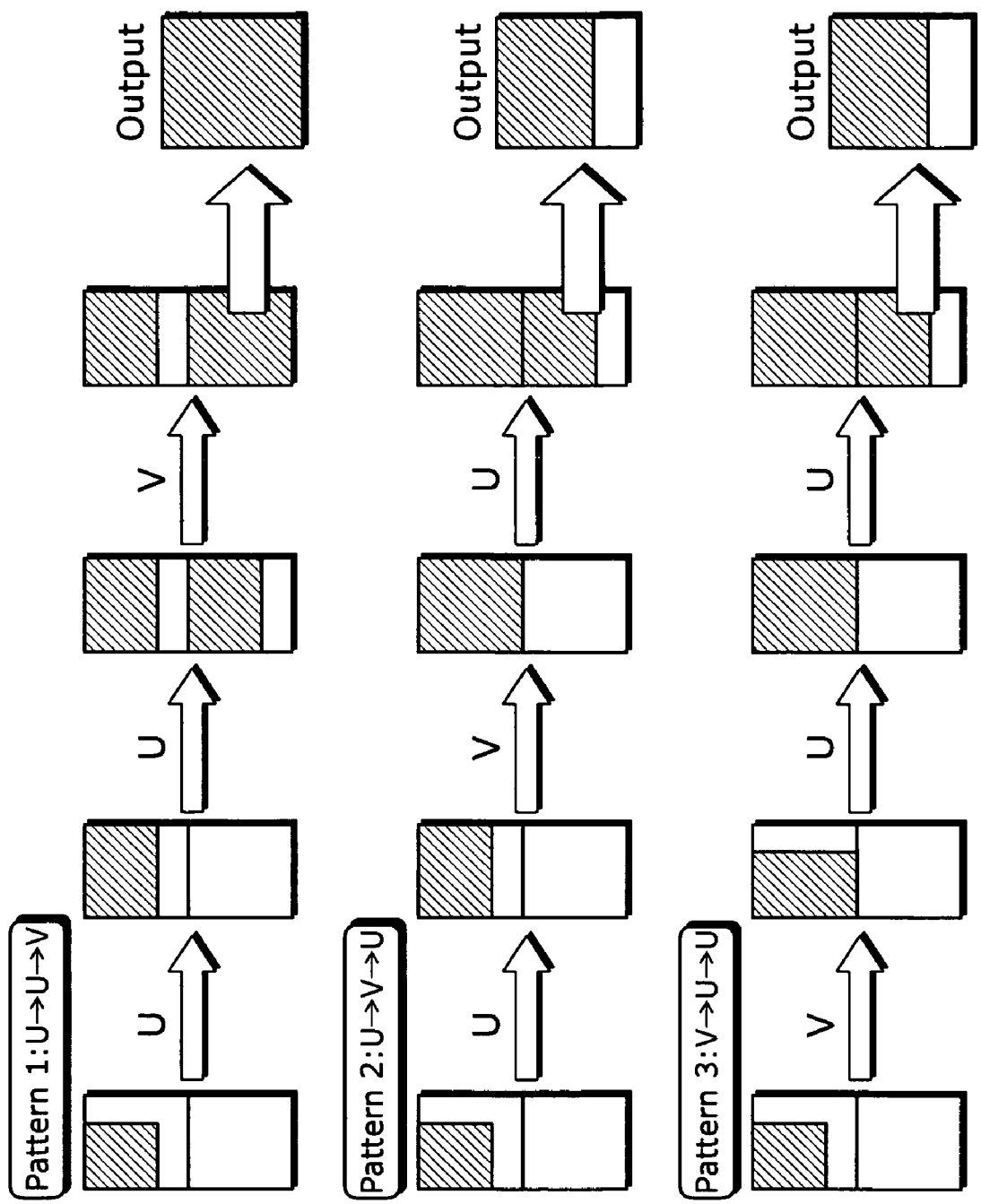

Table for U=2 and V=1

| INPUT | | | | OUTPUT | | | |
|---|---|---|---|---|---|---|---|
| i | j | k | D | i | j | k | D |
| 0 | 0 | 0 | j | 0 | 0 | 0 | j |
| 0 | 0 | 1 | j | 0 | 0 | 1 | j |
| 0 | 0 | 2 | j | 0 | 0 | 2 | j |
| 0 | 0 | 3 | j | 0 | 0 | 3 | j |
| 0 | 0 | 0 | j | 1 | 0 | 0 | j |
| 0 | 0 | 1 | j | 1 | 0 | 1 | j |
| 0 | 0 | 2 | j | 1 | 0 | 2 | j |
| 0 | 0 | 3 | j | 1 | 0 | 3 | j |
| 1 | 0 | 0 | k | 1 | 0 | 0 | k |
| 1 | 1 | 0 | k | 1 | 1 | 0 | k |
| 1 | 2 | 0 | k | 1 | 2 | 0 | k |
| 1 | 3 | 0 | k | 1 | 3 | 0 | k |
| 1 | 4 | 0 | k | 1 | 4 | 0 | k |
| 1 | 5 | 0 | k | 1 | 5 | 0 | k |
| 1 | 6 | 0 | k | 1 | 6 | 0 | k |
| 0 | 3 | 0 | j | 1 | 0 | 0 | j |
| 0 | 3 | 1 | j | 1 | 0 | 1 | j |
| 0 | 3 | 2 | j | 1 | 0 | 2 | j |
| 0 | 3 | 3 | j | 1 | 0 | 3 | j |
| 1 | 0 | 0 | k | 1 | 0 | 0 | k |
| 1 | 1 | 0 | k | 1 | 1 | 0 | k |
| 1 | 2 | 0 | k | 1 | 2 | 0 | k |
| 1 | 3 | 0 | k | 1 | 3 | 0 | k |
| 1 | 4 | 0 | k | 1 | 4 | 0 | k |
| 1 | 5 | 0 | k | 1 | 5 | 0 | k |
| 1 | 6 | 0 | k | 1 | 6 | 0 | k |

FIG. 19B

Table for U=1 and V=2

| INPUT | | | | OUTPUT | | | |
|---|---|---|---|---|---|---|---|
| i | j | k | D | i | j | k | D |
| 0 | 0 | 0 | k | 0 | 0 | 0 | k |
| 0 | 1 | 0 | k | 0 | 1 | 0 | k |
| 0 | 2 | 0 | k | 0 | 2 | 0 | k |
| 0 | 3 | 0 | k | 0 | 3 | 0 | k |
| 0 | 0 | 0 | k | 1 | 0 | 0 | k |
| 0 | 1 | 0 | k | 1 | 1 | 0 | k |
| 0 | 2 | 0 | k | 1 | 2 | 0 | k |
| 0 | 3 | 0 | k | 1 | 3 | 0 | k |
| 1 | 0 | 0 | j | 1 | 0 | 0 | j |
| 1 | 0 | 1 | j | 1 | 0 | 1 | j |
| 1 | 0 | 2 | j | 1 | 0 | 2 | j |
| 1 | 0 | 3 | j | 1 | 0 | 3 | j |
| 1 | 0 | 4 | j | 1 | 0 | 4 | j |
| 1 | 0 | 5 | j | 1 | 0 | 5 | j |
| 1 | 0 | 6 | j | 1 | 0 | 6 | j |
| 0 | 0 | 3 | k | 1 | 0 | 0 | k |
| 0 | 1 | 3 | k | 1 | 1 | 0 | k |
| 0 | 2 | 3 | k | 1 | 2 | 0 | k |
| 0 | 3 | 3 | k | 1 | 3 | 0 | k |
| 1 | 0 | 0 | j | 1 | 0 | 0 | j |
| 1 | 0 | 1 | j | 1 | 0 | 1 | j |
| 1 | 0 | 2 | j | 1 | 0 | 2 | j |
| 1 | 0 | 3 | j | 1 | 0 | 3 | j |
| 1 | 0 | 4 | j | 1 | 0 | 4 | j |
| 1 | 0 | 5 | j | 1 | 0 | 5 | j |
| 1 | 0 | 6 | j | 1 | 0 | 6 | j |

FIG. 22

| Distance from Viewpoint L | Subdivision level |
|---|---|
| $0 <= L < ML_0$ | 0 |
| $ML_0 <= L < ML_1$ | 0.5 |
| $ML_1 <= L < ML_2$ | 1 |
| $ML_2 <= L < ML_3$ | 1.5 |
| $ML_3 <= L < ML_4$ | 2 |
| $ML_4 <= L < ML_5$ | 2.5 |
| $ML_5 <= L < ML_6$ | 3 |
| $ML_6 <= L < ML_7$ | 3.5 |
| $ML_7 <= L < ML_8$ | 4 |
| $ML_8 <= L < ML_9$ | 4.5 |
| $ML_9 <= L$ | 5 |

CURVED SURFACE SUBDIVISION APPARATUS

BACKGROUND OF THE INVENTION (1) Field of the Invention

The present invention relates to an apparatus for representing curved surfaces in computer graphics, and particularly to a curved surface subdivision apparatus for performing subdivision processing on curved surfaces for polygonal approximations thereof.

(2) Description of the Related Art

In recent years, computer graphics (hereinafter referred to as "CG") has been indispensable as one type of an image production technique. In modeling that is an important constituent technology in the field of CG, representation of an object by use of a set of polygons is the most popular technique for object rendering. However, with the advances in the CG technology, object rendering in various forms has been in increasing demand. Object rendering by use of parametric surfaces such as NURBS surfaces and Bezier surfaces is a typical example. Generally speaking, an object represented by such parametric surfaces has advantages over an object represented by a set of polygons, in that the former is more compact in an amount of data and has a higher affinity for data transmission via a network such as a LAN and the Internet.

FIG. 1 shows an example of an order 4 (a degree 3) rational Bezier surface that is a typical parametric surface. An order 4 (a degree 3) rational Bezier surface is expressed by the following equation:

$$B(u, v) = UMQM^T V = UM \begin{bmatrix} Q_{00} & Q_{01} & Q_{02} & Q_{03} \\ Q_{10} & Q_{11} & Q_{12} & Q_{13} \\ Q_{20} & Q_{21} & Q_{22} & Q_{23} \\ Q_{30} & Q_{31} & Q_{32} & Q_{33} \end{bmatrix} M^T V \quad \text{Equation 1}$$

$$M = \begin{bmatrix} -1 & 3 & -3 & 1 \\ 3 & -6 & 3 & 0 \\ -3 & 3 & 0 & 0 \\ 1 & 0 & 0 & 0 \end{bmatrix},$$

$$U = [u^3 \ u^2 \ u \ 1], V = [v^3 \ v^2 \ v \ 1]^T$$

A rational Bezier surface is expressed by use of two independent parameters. In this example, the first and second axis directions of a plane expressed by these parameters that define the curved surface shall be a u direction and a v direction respectively, for example. It should be noted that $0<=u<=1$ and $0<=v<=1$ hold in this example. $Q_{ij}$ (i=0, ..., 3, j=0, ..., 3) are control points that define a shape of a rational Bezier surface, and an order 4 (a degree 3) Bezier surface is defined by a grid of 4×4=16 control points.

Among these control points, $Q_{00}$, $Q_{30}$, $Q_{03}$, $Q_{33}$ are located on the surface but other points are located out of the surface. Each control point includes a w component corresponding to weight in addition to x, y and z components indicating the location of the point. Weight is an index indicating strength of influence that each control point has on a shape of a Bezier surface. It is often convenient to use quartic (degree 4) homogeneous coordinate representation in order to handle these components in an unified manner. There are relations $X=w*x$, $Y=w*y$, $Z=w*z$ and $W=w$ between the components X, Y, Z and W expressed in the homogeneous coordinate and the components x, y, z and w, where * indicates a multiplication.

In addition, it is known that a Bezier surface has convex hull property and thus the surface is completely contained in a polyhedron that is formed by control points.

For high-speed hardware rendering of an object represented by parametric surfaces, approximation of the object as polygonal models is very effective. Such approximation of the object is achieved by calculating points located on each surface based on control points and connecting these points. A Bezier surface has a property that the points obtained by calculating the points that split distances between neighboring control points are located on the surface (which will be described in detail later). As for a conventional technique for processing curved surface graphics by use of this property, see, for example, Japanese Laid-Open Patent Application No. 2001-331812 Publication "Graphic Information Generation Apparatus, Image Processing Apparatus, Information Processing Apparatus, Graphic Information Generation Method and Storage Medium", p. 7–p. 11.

In the above conventional technology, a linear interpolation unit is provided. When generating vertex values for representing a curved surface graphics based on a grid of control points that define the shape of the surface, this linear interpolation unit calculates, in sequence, $A\times(1-t)+B\times t$ for a coordinate value of a new control point that splits a distance between neighboring control points, where A and B are the neighboring control points of predetermined bit width and t is an interpolation coefficient having a value of $0 \leq t \leq 1$ of predetermined bit width. Then, the linear interpolation unit calculates new control points between neighboring control points in sequence so as to finally obtain the coordinate values of the vertices for representing the curved surface graphics. It also calculates a lot of coordinate values for representing the curved surface graphics by updating the value of the interpolation coefficient t.

However, according to the above-mentioned conventional technology, since the graphic information generation unit needs to control not only input and output of control points but also update of the interpolation coefficient t, for example, keeping the current value thereof during a series of processing and updating the value after the processing, the structure of the linear operation unit is complex. Therefore, how to reduce an amount of operation is a problem in representation of curved surface images.

In addition, in order to represent a three-dimensional (3D) object in more detail and realistically, the number of subdivisions of polygons must be increased inevitably for approximation of curved surfaces, and thus there is a problem of increase in calculation load.

SUMMARY OF THE INVENTION

Under these circumstances, the present invention has been made in view of the above problems, and an object of the present invention is to provide a curved surface subdivision apparatus that allows subdivision processing in a simple hardware structure and a small-sized memory.

Another object of the present invention is to provide a curved surface subdivision apparatus that allows high-speed processing of generating a 3D surface even if the subdivision levels in the first and second axis directions of a parametric surface are different from each other.

In order to solve the above-mentioned problems, the curved surface subdivision apparatus of the present invention is a curved surface subdivision apparatus comprising: a subdivision level determination unit operable to determine the number of subdivisions for a curved surface; a work memory unit operable to hold control point information that defines a shape of the surface, as well as an intermediate result and a final result of a series of subdivision processing; a subdivision processing operation unit operable to read first control point information from the work memory unit, generate second control point information, and write the second control point information into the work memory unit, said first control point information being control point information about a sequence of control points that align in one of a first axis direction and a second axis direction of the surface before the subdivision processing, said second control point information being control point information about a sequence of control points which are newly generated as a result of the subdivision processing; and an operation control unit operable to determine first memory addresses and second memory addresses, said first memory addresses specifying an area of the work memory unit where the first control point information is stored, said second memory addresses specifying an area of the work memory unit where the second control point information is to be stored; wherein the subdivision processing operation unit writes, under control of the operation control unit, the second control point information into the area of the work memory unit specified by the second memory addresses, over the first control point information which is stored in the area of the work memory unit specified by the first memory addresses, said first memory addresses being a subset of said second memory addresses.

According to this structure, the subdivision processing operation unit does not store, into another work memory unit, the second control point information which is newly generated as a result of the subdivision processing, but writes it over the first control point information in the same work memory unit. Therefore, it is possible for the subdivision processing operation unit to execute the subdivision processing using a small-size work memory unit with a smaller amount of memory capacity.

In addition, the curved surface subdivision apparatus of the present invention further comprises a control table holding unit operable to hold a control table in which the first memory addresses and the second memory addresses of the work memory unit are described in order of the series of subdivision processing throughout said processing for combinations of the respective numbers of subdivisions in the first and second axis directions, and the operation control unit determines the first memory addresses and the second memory addresses with reference to the control table.

This structure includes the control table holding unit for holding the control table in which the memory addresses before and after the subdivision processing are described. Therefore, it is possible for the operation control unit to reduce an amount of its operation because complex control is not required.

Furthermore, in the curved surface subdivision apparatus of the present invention, the subdivision level determination unit sets, for the subdivision processing operation unit, the number of subdivisions of which value is not an integer. More preferably, the curved surface subdivision apparatus of the present invention further comprises: a control point selection unit operable to select control points used for generation of a polygon by judging whether the number of subdivisions set for the subdivision processing operation unit is an integer value or a value with 0.5; and a polygon generation unit operable to generate the polygon using the control points selected by the control point selection unit.

According to this structure, the subdivision level determination unit sets the subdivision level that is a value with 0.5, and the control point selection unit selects control points that meet the condition by judging whether the subdivision level is an integer value or a value with 0.5. Therefore, it is possible to prevent a significant increase in the number of polygons generated as a result of the subdivision processing and thus lighten the calculation load for polygon generation.

It should be noted that the present invention can be realized not only as the above-mentioned curved surface subdivision apparatus, but also as a curved surface subdivision method including steps executed by the units included in this curved surface subdivision apparatus, or as a program that causes a computer or the like to realize this curved surface subdivision method. Needless to say, the program can be distributed via a recording medium such as a CD-ROM and a transmission medium such as a communication network.

As further information about the technical background to this application, the disclosure of Japanese Patent Application No. 2003-276840 filed on Jul. 18, 2003 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 5 is an example of a table used for determining subdivision levels depending on distances from a viewpoint;

FIG. 8 is an example of a control table stored in a subdivision processing operation control unit;

FIGS. 10A, 10B and 10C are diagrams showing states of the work memory unit when three patterns of subdivision processing are executed twice in the u direction and once in the v direction;

FIG. 11A is a diagram showing a state in the work memory unit as a result of executing subdivision processing only in the u direction when the memory unit is in the initial state;

FIG. 11B is a diagram showing a state in the work memory unit as a result of executing subdivision processing only in the v direction when the memory unit is in the initial state;

FIG. 11C is a diagram showing a state in the work memory unit as a result of executing subdivision processing once in the u direction and v direction respectively;

Figures 12A, 12B:
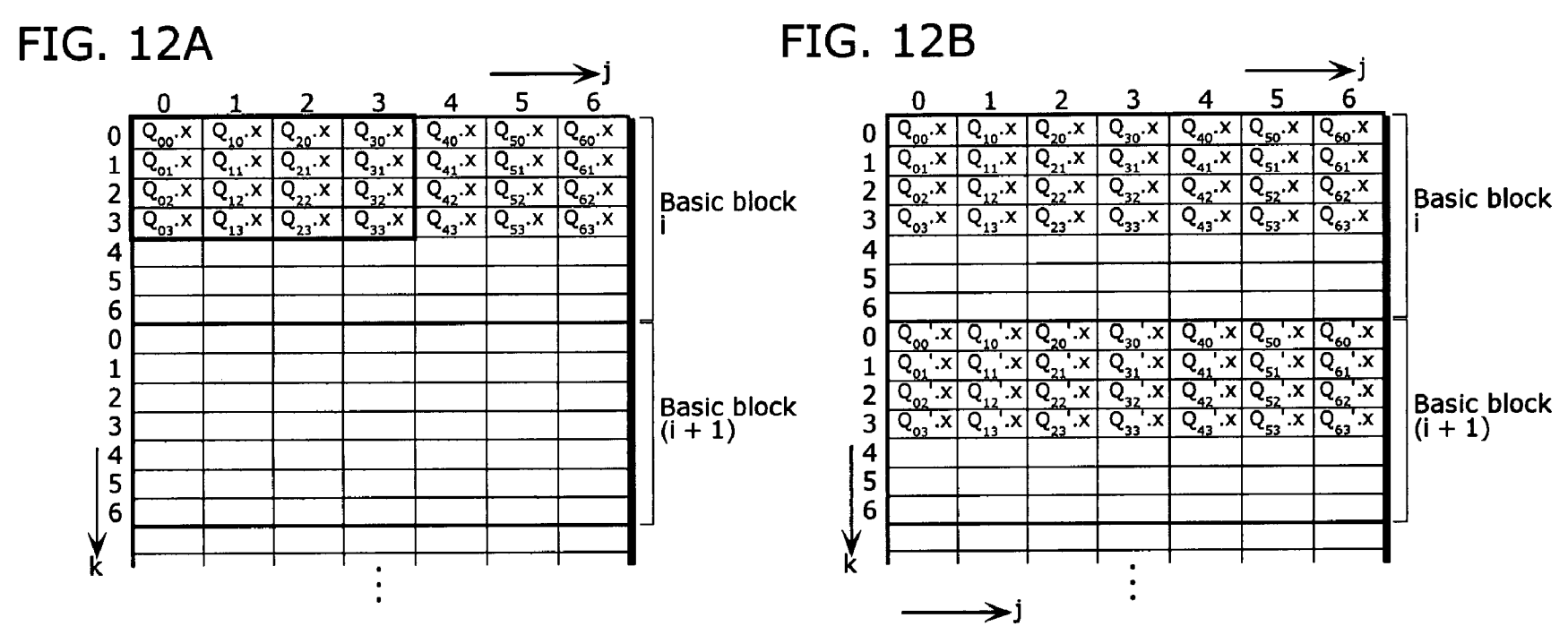

FIG. 12A is a diagram showing a state in the work memory unit before subdivision processing;

FIG. 12B is a diagram showing a state in the work memory unit immediately after subdivision processing is executed in the u direction on the data stored in a basic block i of a zone 0;

Figures 13A, 13B, 13C:
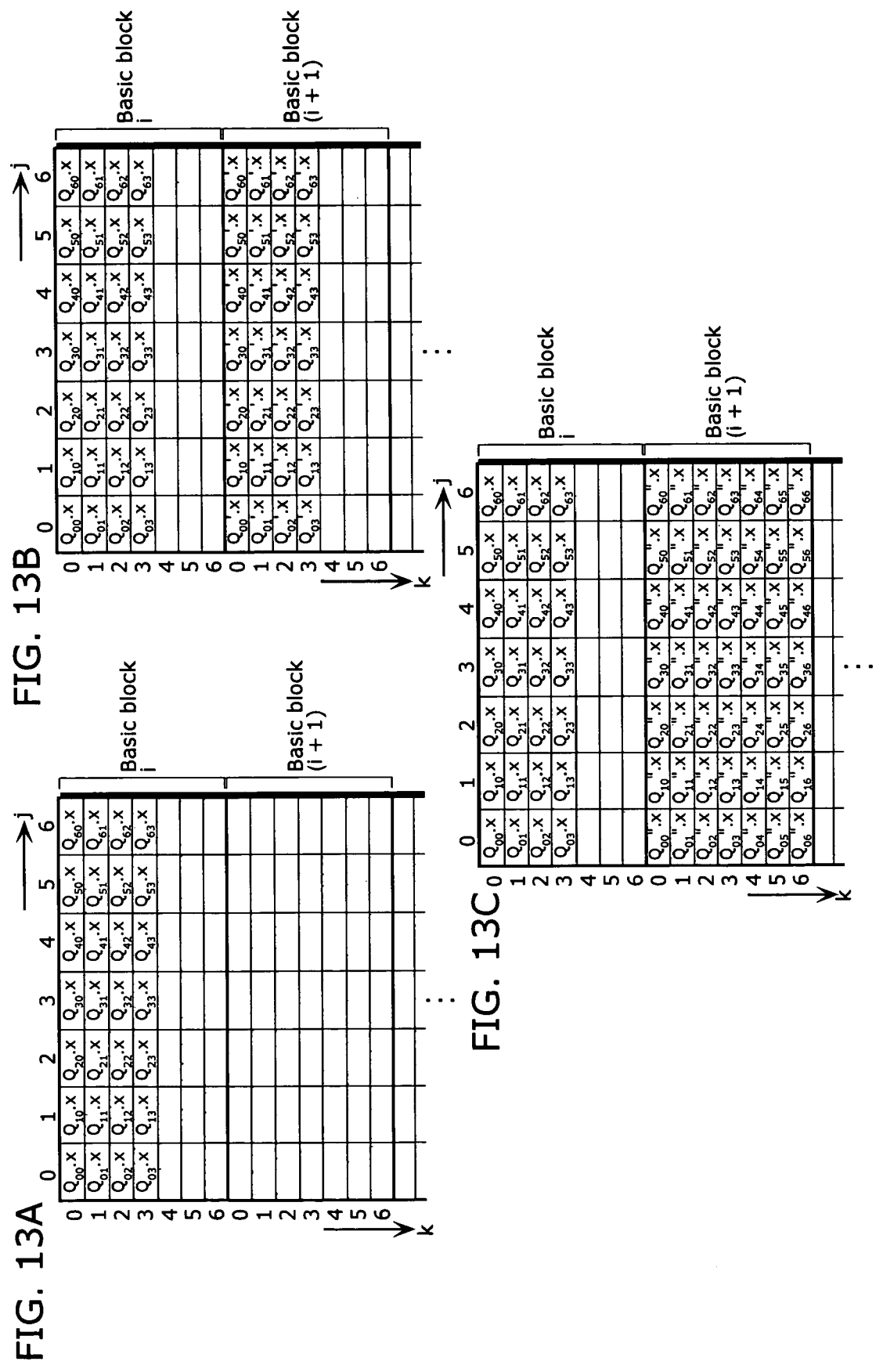

FIG. 13A is a diagram showing a state in the work memory unit before subdivision processing;

FIG. 13B is a diagram showing a state in the work memory unit immediately after subdivision processing is executed in the u direction on the data stored in the basic block i of the zone 0;

FIG. 13C is a diagram showing a state in the work memory unit immediately after subdivision processing is further executed in the v direction;

FIG. 19A and FIG. 19B are control tables for two patterns of subdivision processing in which subdivision levels in the u and v directions are transposed;

FIG. 22 is an example of a table in which mid-levels can be set based on distances from a viewpoint of an object.

DESCRIPTION OF THE PREFERRED EMBODIMENT(S)

The curved surface subdivision apparatus according to each of the embodiments of the present invention will be explained below with reference to the drawings. In the following embodiments, an order 4 (or a degree 3) rational Bezier surface is taken as an example, but the present invention can be applied to a rational or non-rational Bezier surface of an arbitrary order (or degree). It is well known that a NURBS surface can be represented by a set of rational Bezier surfaces using a knot insertion algorithm. Therefore, if the present invention includes a unit for allowing such representation of a NURBS surface, it can also be applied to an arbitrary NURBS surface.

First Embodiment

The curved surface subdivision apparatus in the first embodiment of the present invention will be explained with reference to the drawings.

Figure 2:
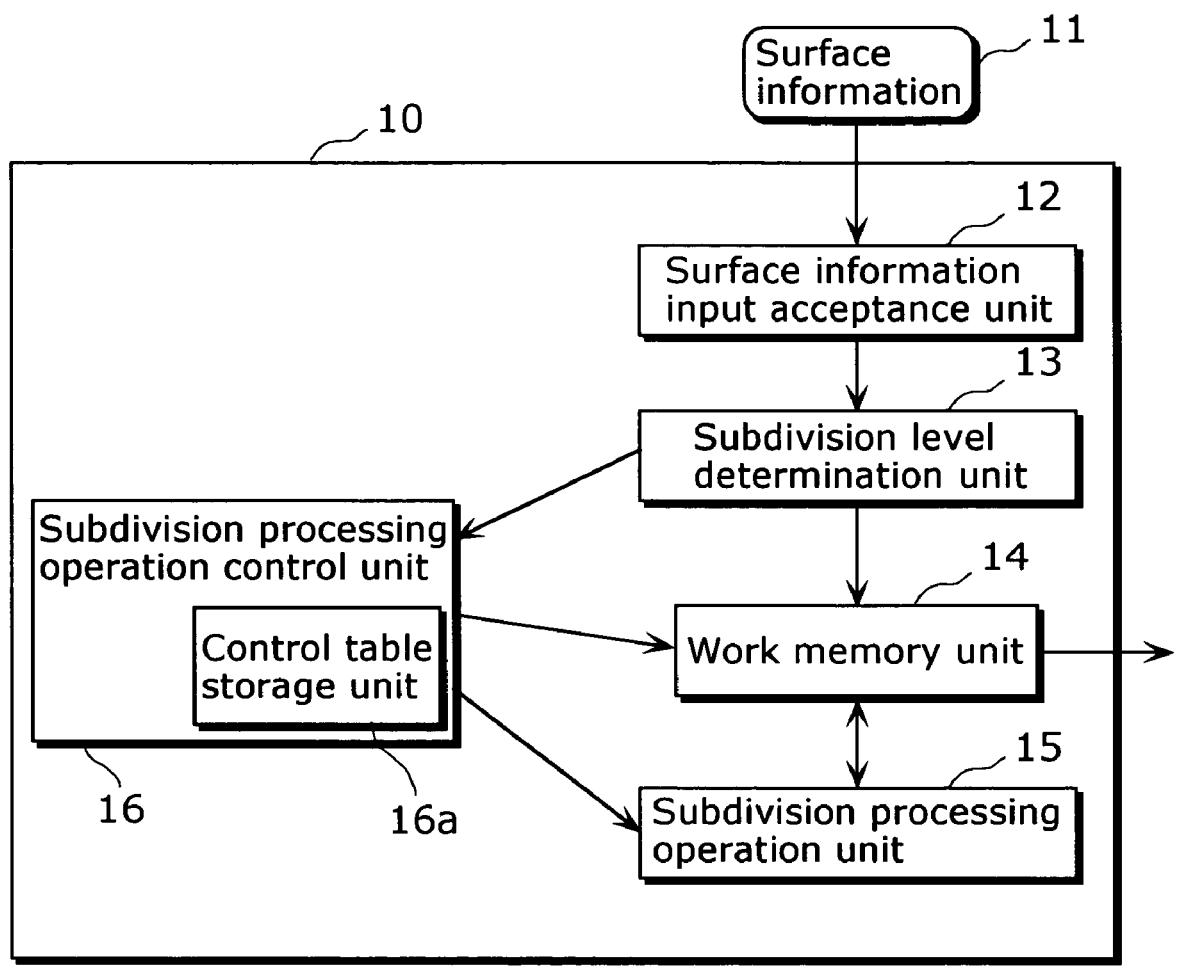
FIG. 2 is a functional block diagram of a curved surface subdivision apparatus in a first embodiment of the present invention.

FIG. 2 is a functional block diagram of the curved surface apparatus in the first embodiment of the present invention.

A curved surface subdivision apparatus 10 in the first embodiment of the present invention includes a surface information input acceptance unit 12, a subdivision level determination unit 13, a work memory unit 14, a subdivision processing operation unit 15 and a subdivision processing operation control unit 16. The function of each of the above units will be explained below in detail.

Surface information 11 is shape data of an object to be rendered. Since the object is represented by a rational Bezier surface, the shape data thereof is coordinate values and weights of control points specifically. The control points may be represented by either a 3D space coordinate system or a 4D homogeneous coordinate system. In the first embodiment, control points shall be represented by a 4D homogeneous coordinate system. The object may be represented by a set of a plurality of rational Bezier surfaces, and each control point may include texture coordinate data and material data in addition to the shape data.

The surface information input acceptance unit 12 accepts the input of the surface information 11 and transfers it to the subdivision level determination unit 13. In the case where the object is constructed by a plurality of rational Bezier surfaces, the above-mentioned processing is repeated until the inputs of all the surface patch data are completed.

Next, subdivision processing and subdivision levels will be defined before the explanation of the subdivision level determination unit 13.

As mentioned above, a rational Bezier surface has a property that the points obtained by calculating in sequence points that split the distances between neighboring control points are located on the surface. The processing of calculating points located on a rational Bezier surface using this property and subdividing the surface into a plurality of piecewise surface patches will be hereinafter referred to as subdivision processing.

Figure 3:
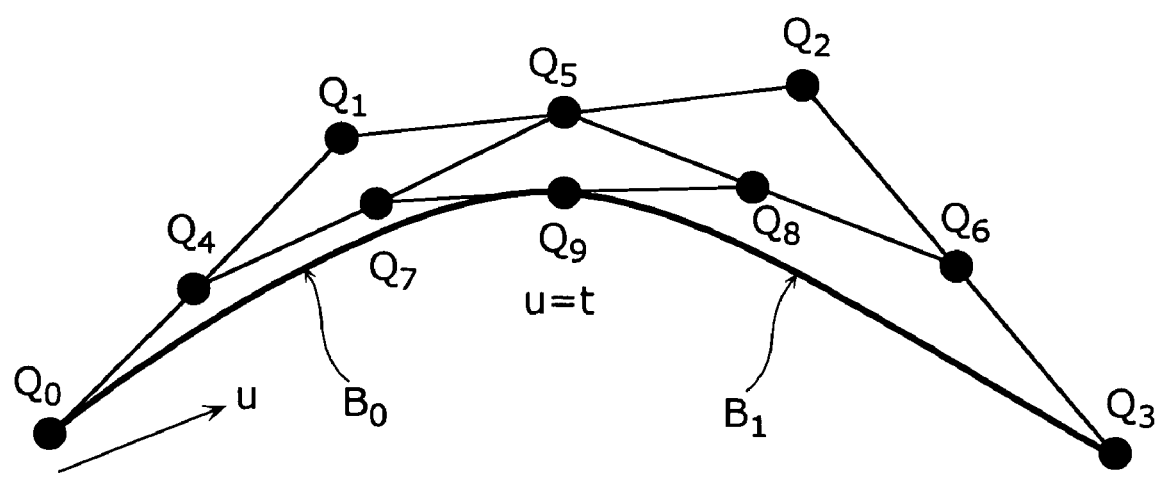
FIG. 3 is a diagram for explaining subdivision processing by use of De Casteljau Algorithm.

FIG. 3 shows an example of subdivision of a rational Bezier curve using De Casteljau Algorithm that is a typical algorithm for subdivision processing. As shown in FIG. 3, as for an order 4 (or a degree 3) rational Bezier curve constructed by control points $Q_0$, $Q_1$, $Q_2$ and $Q_3$, the points that split the distances between neighboring control points $Q_0$ and $Q_1$, $Q_1$ and $Q_2$, $Q_2$ and $Q_3$ are calculated by applying $C=A\times(1-t)+B\times t$ (where A and B are neighboring control points, t is an interpolation coefficient indicating a ratio of splitting the distance between A and B, and C is a newly calculated point) by use of this algorithm. In this algorithm, vertices $Q_4$, $Q_5$ and $Q_6$ are first obtained, and vertices $Q_7$ and $Q_8$ are further obtained by calculating points that split the distances between $Q_4$ and $Q_5$ and $Q_5$ and $Q_6$. When the point $Q_9$ between $Q_7$ and $Q_8$ is obtained finally, the vertex $Q_9$ is located on the original rational Bezier curve, which is subdivided into two Bezier curves $B_0$ and $B_1$ constructed by new control points $Q_0$-$Q_4$-$Q_7$-$Q_9$ and $Q_9$-$Q_8$-$Q_6$-$Q_3$ respectively. It should be noted that the calculated vertex $Q_9$ is a point of u=t which is located on a parametric space. If the same processing is applied respectively to the Bezier curves $B_0$ and $B_1$ obtained by the above-mentioned subdivision, these two Bezier curves $B_0$ and $B_1$ are further subdivided.

Figure 4A:
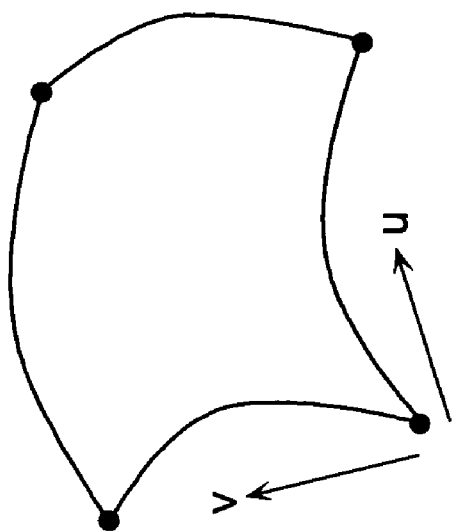
FIG. 4A is a diagram showing an example of a surface patch before subdivision processing.
Figure 4C:
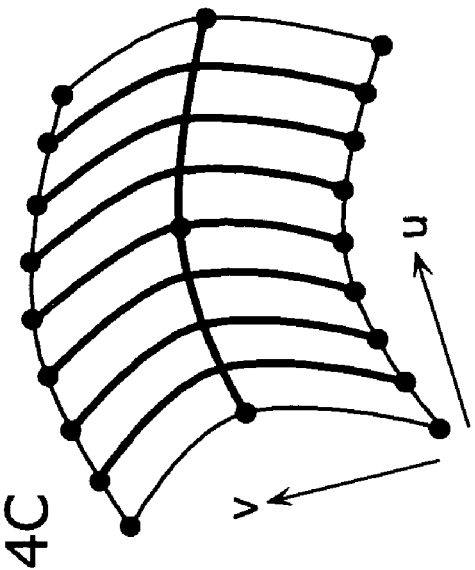
FIG. 4C is a diagram showing an example of a surface patch generated as a result of level 3 subdivision processing in u direction and level 1 subdivision processing in v direction.
Figure 4B:
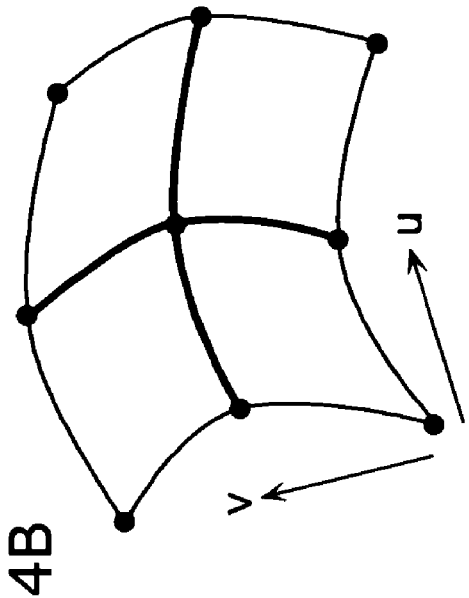
FIG. 4B is a diagram showing an example of a surface patch generated as a result of level 1 subdivision processing.

As for a rational Bezier surface, a single surface patch is subdivided into a set of plurality of small patches by applying the above-mentioned processing to both the u and v directions. A small patch generated as a result of this subdivision of a surface patch will be hereinafter referred to as a subpatch, as distinguished from a surface patch to be subdivided. One processing in each of the u and v directions causes subdivision of a single surface patch into four subpatches, but the surface patch does not always need to be subdivided the same number of times in both directions. FIG. 4A shows an example of a rational Bezier surface patch before subdivision processing, FIG. 4B shows a rational Bezier surface patch as a result of executing subdivision processing once in both the u and v directions, and FIG. 4C shows a rational Bezier surface as a result of executing subdivision processing three times in the u direction and one time in the v direction. The number of times of subdivision processing is defined as a subdivision level.

The subdivision level determination unit 13 determines the subdivision levels of an inputted surface patch in the u and v directions respectively. The subdivision level can be determined in various methods, but any specific method is not chosen in the present embodiment. Four methods will be explained below, for example.

(1) Method Using a Fixed Value

A subdivision level is previously determined, and all the patches are subdivided at a fixed level. The subdivision level can be determined at a very high speed, but there is a problem that processing efficiency is lowered, such that a patch which should be subdivided into small pieces is not divided, or on the contrary, a patch which does not need to be subdivided is divided.

(2) Method Using a Distance from a Viewpoint

A viewpoint and viewing direction need to be determined on a virtual space for object rendering in 3D computer graphics. Here, an object located near a viewpoint is likely to be displayed larger, whereas an object located far from the viewpoint is likely to be displayed smaller. Therefore, it is natural to consider that the object near the viewpoint should be subdivided finely and the object far from the viewpoint should be subdivided coarsely. So, the distance from the viewpoint to the object is calculated so that the subdivision level is dynamically controlled depending on the calculated distance from the viewpoint. To be more specific, a table indicating relation between distances from a viewpoint and the corresponding subdivision levels, as shown in FIG. 5, is prepared in advance, and the subdivision level for each surface patch is determined by referring to the table. For example, in FIG. 5, $ML_4 <= L$ means that subdivision processing is executed five times.

(3) Method Using a Display Area on a Screen

Because of the same reason as mentioned in above (2), a curved surface patch is projected on a screen placed in a virtual space, and the subdivision level thereof is determined depending on the display area of the patch on the screen. To be more specific, in the same manner as the above (2), a table indicating relation between the display areas on the screen and the corresponding subdivision levels is prepared, and referring to this table, the subdivision level of each surface patch can be determined.

(4) Method Using a Distance Between Neighboring Control Points

Figure 1:
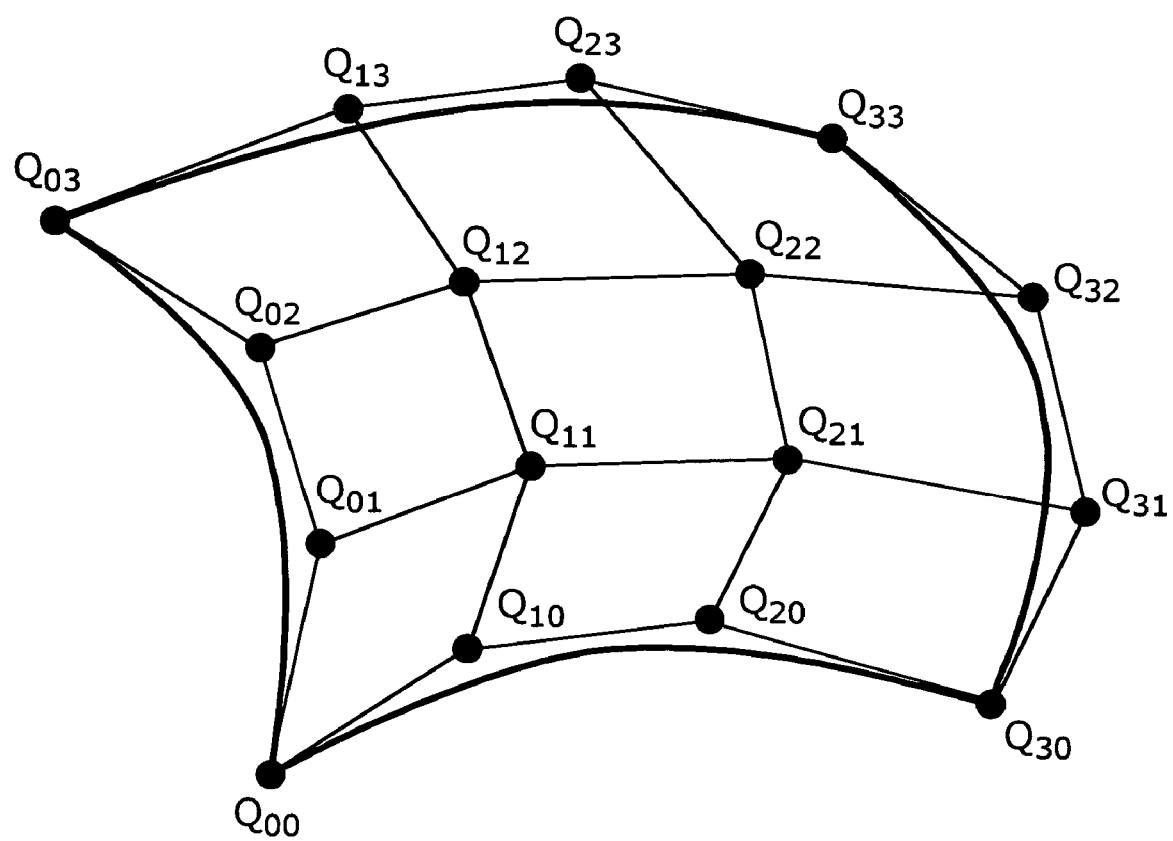
FIG. 1 is a diagram showing an example of an order 4 (a degree 3) rational Bezier surface.

It is not possible to determine different subdivision levels in the u and v directions, using the above (2) and (3) methods. So, the subdivision levels in the u direction and the v direction are determined respectively, using distances between neighboring control points. For example, the curved surface subdivision apparatus 10 as shown in FIG. 1 calculates the following values respectively.

$$LU=(|Q_{30}-Q_{00}|+|Q_{33}-Q_{03}|)/2$$

$$LV=(|Q_{03}-Q_{00}|+|Q_{33}-Q_{30}|)/2$$

|·| indicates a distance between two neighboring control points. In the same manner as the above (2) and (3), tables that respectively indicate relation between LU and LV and the corresponding subdivision levels are prepared, and the subdivision levels in the u direction and the v direction are determined based on the calculated LU value and LV value respectively.

Using each of the above methods (1) to (4) or a combination of these methods, the subdivision level of a surface patch is determined. Hereinafter, the subdivision level in the u direction is referred to as a u-direction level, and the subdivision level in the v direction is referred to as a v-direction level. The determined u-direction level and v-direction level are transferred to the subdivision processing operation control unit 16. The control point data that constitutes the surface patch is transferred to the work memory unit 14.

Next, the functions of the work memory unit 14, the subdivision processing operation unit 15 and the subdivision processing operation control unit 16 will be described in detail. The following explanation will be made, taking, as an example, the case where the subdivision level determination unit 13 determines that the u-direction level is 2 and the v-direction level is 1 for the target surface patch. However, it is also possible to perform the same processing using the same method even if the subdivision level determination unit 13 determines any other subdivision levels.

As is obvious from FIG. 3, in the subdivision processing for an order 4 (or a degree 3) rational Bezier curve, when four control points ($Q_0$, $Q_1$, $Q_2$ and $Q_3$ in the case of FIG. 3) are obtained, points that split the distances between respective neighboring control points are calculated so as to generate seven vertices ($Q_0$, $Q_4$, $Q_7$, $Q_9$, $Q_8$, $Q_6$ and $Q_3$). As for a Bezier surface, similar processing is applied extendedly into two dimensions because it should be performed in the u and v directions respectively.

Figure 6:
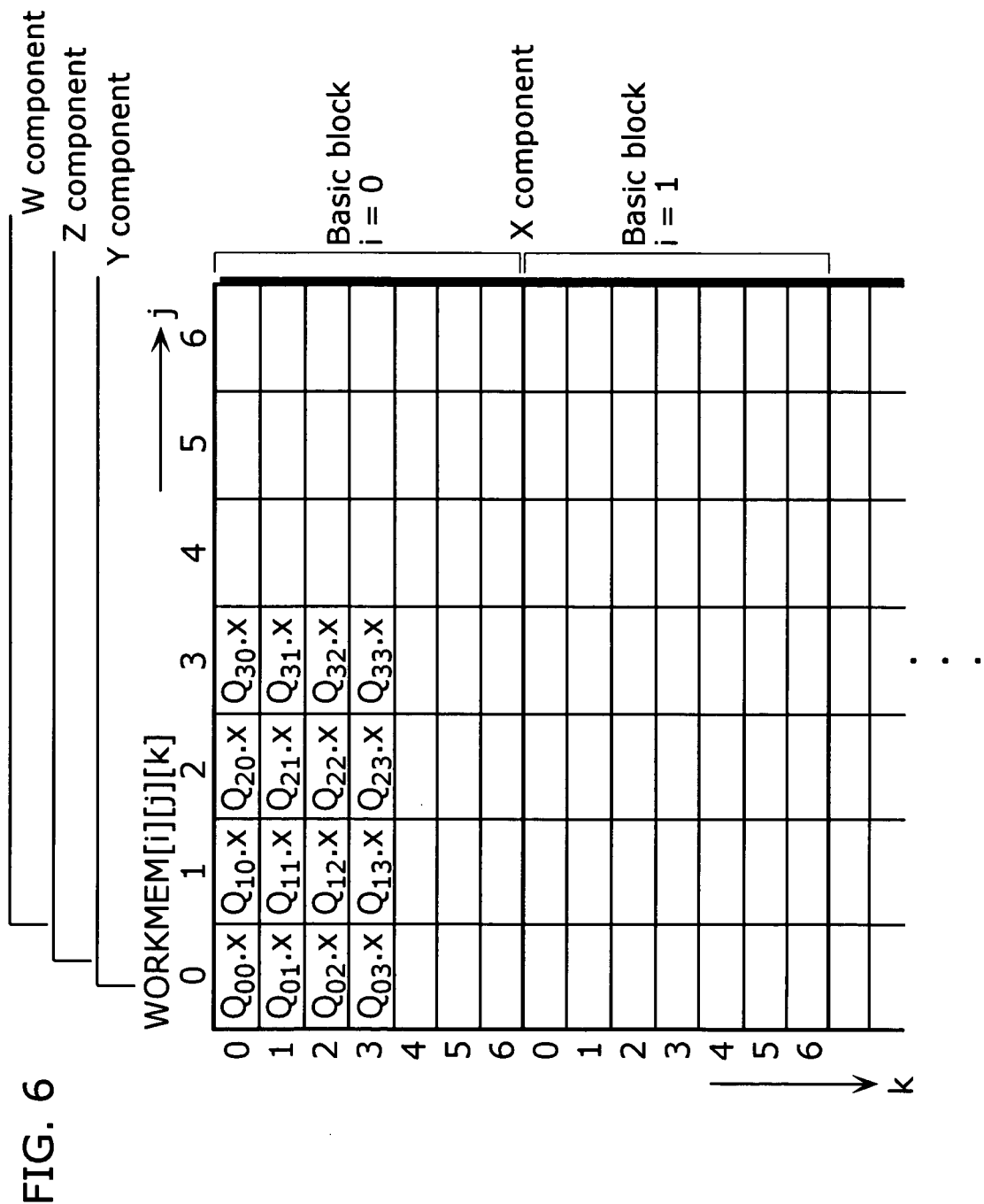
FIG. 6 is a diagram showing a work memory unit schematically.

FIG. 6 is a diagram showing schematically the structure of the work memory unit 14 of the curved surface subdivision apparatus 10 in the first embodiment of the present invention. As shown in FIG. 6, the work memory unit 14 has the structure consisting of blocks, each of which consists of 7×7 components, in order for the subdivision processing to be executed efficiently. Basically, the subdivision processing of one level in the u direction and one level in the v direction is executed using one block. This block is hereinafter referred to as a basic block. The work memory unit 14 has to hold the basic blocks of the number which is equal to or larger than the maximum value of the subdivision level. For example, if the maximum subdivision level is 3, at least three basic blocks are needed.

In addition, FIG. 6 shows the initial state of the work memory unit 14 immediately after the surface patch of which subdivision level is determined by the subdivision level determination unit 13 is transferred to the work memory unit 14. As shown in FIG. 6, an ordered sequence of control points in the u direction are stored in the work memory unit 14 so that they align in the same order in the j direction, whereas an ordered sequence of control points in the v direction are stored so that they align in the same order in the k direction. For the sake of simple explanation, the work memory unit 14 will be referred to as WORKMEM, and a memory address indicating the basic block number i, the location in the column direction j and the location in the row direction k will be represented as WORKMEM [i][j][k]. For example, in FIG. 6, data stored in WORKMEM [0][1][2] is $Q_{12} \cdot x$.

It should be noted, as shown in FIG. 6, that the case where X, Y, Z and W components are respectively structured by separate work memories is explained in the first embodiment of the present invention, but the present invention is not limited to this case. For example, X, Y, Z and W components may be stored consecutively, as the components WORKMEM [i][j][k], into the work memory unit 14.

The subdivision processing operation unit 15 is a hardware for reading, from the work memory unit 14, a sequence of the vertex data stored in an area specified by the addresses determined by the subdivision processing operation control unit 16, and executing subdivision processing for the case of an interpolation coefficient t=½ based on the De Casteljau algorithm. When the inputted vertex data is $Q_0$, $Q_1$, $Q_2$ and $Q_3$ and the data which is generated as a result of the subdivision processing is $Q_0'$, $Q_1'$, $Q_2'$, $Q_3'$, $Q_4'$, $Q_5'$ and $Q_6'$, the following equations are satisfied.

$$Q_0' = Q_0, \; Q_1' = \frac{(Q_0 + Q_1)}{2}, \; Q_2' = \frac{(Q_0 + 2Q_1 + Q_2)}{4}, \quad \text{Equation 2}$$

$$Q_3' = \frac{(Q_0 + 3Q_1 + 3Q_2 + Q_3)}{8}, \; Q_4' = \frac{(Q_1 + 2Q_2 + Q_3)}{4},$$

$$Q_5' = \frac{(Q_2 + Q_3)}{2}, \; Q_6' = Q_3$$

Figure 7:
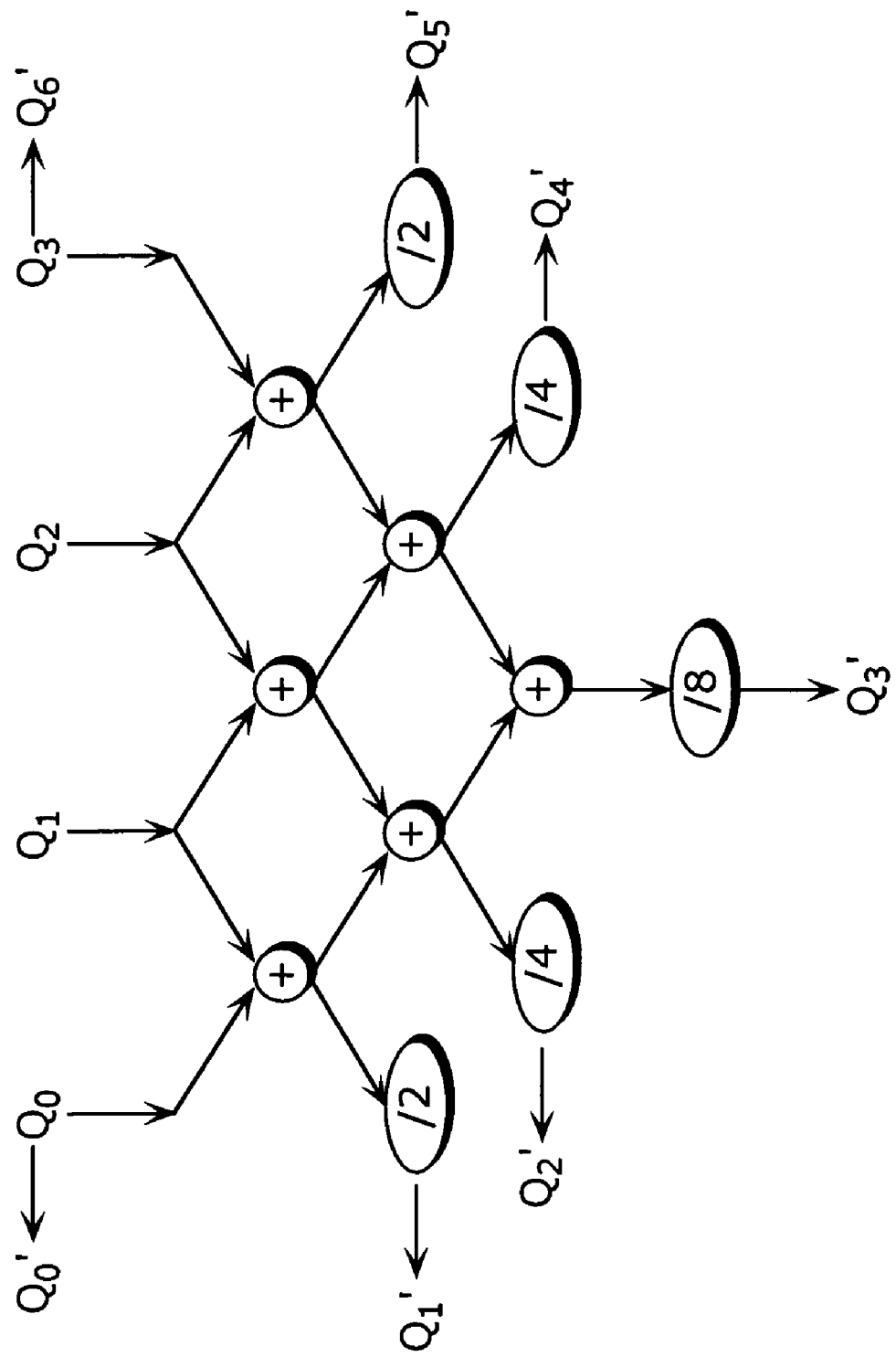
FIG. 7 is a diagram showing a hardware structure of a subdivision processing operation unit schematically.

The subdivision processing operation unit 15 is structured by an adder, multiplier, shifter or the like in order to execute the above operations. FIG. 7 shows a schematic representation of the subdivision processing operation unit 15, but the hardware structure thereof is not particularly limited here. As is obvious from FIG. 7, the subdivision processing operation unit 15 can be realized by a very simple hardware.

The subdivision processing operation control unit 16 holds a control table for controlling input and output of control point data into and from the work memory unit 14 depending on each subdivision level. The subdivision processing operation control unit 16 also includes a control table storage unit 16a for holding the control table, in which memory addresses specifying an area in the work memory unit 14 where the control point data before and after subdivision processing are stored are described.

A table for controlling input and output of the data into and from the work memory unit 14 will be hereinafter referred to as a control table. When obtaining the subdivision levels from the subdivision level determination unit 13, the subdivision processing operation control unit 16 sets a control table that corresponds to the subdivision levels. In this case, the subdivision processing operation control unit 16 sets a control table that corresponds to the u-direction subdivision level=2 and the v-direction subdivision level=1. FIG. 8 shows an example of such a control table.

On a control table 20 as shown in FIG. 8, "i", "j", "k" and "D" of INPUT respectively indicate the basic block number in the work memory unit 14 where the data inputted into the subdivision processing operation unit 15 is stored, and the j-direction location, the k-direction location and the reading direction in which reading of the data starts, whereas "i", "j", "k" and "D" of OUTPUT respectively indicate the basic block number in the work memory unit 14 where the data of the operation result is to be stored, and the j-direction location, the k-direction location and the writing direction in which writing of the data starts. As for the reading or writing direction, "j" indicates that the data is read (or written) in the j direction and "k" indicates that the data is read (or written) in the k direction.

For example, S10 indicates that four pieces of data are read out from the work memory unit 14 in the j direction, starting from the data of WORKMEM [0][0][0] therein, the subdivision processing of them is executed, and then the generated seven pieces of data are written in the j direction into the work memory unit 14, starting from WORKMEM [0][0][0] therein. S11 indicates that four pieces of data are read out from the work memory unit 14 in the k direction, starting from the data of WORKMEM [1][0][0] therein, the subdivision processing of them is executed, and then the generated seven pieces of data are written in the k direction into the work memory unit 14, starting from WORKMEM [1][0][0] therein. A series of these steps is described in time sequence in the control table until the end of the subdivision processing. The structure of the control table is not limited to the above one. For example, it is also possible to add an item indicating the number of loops to the above control table so that the steps for the first to fourth rows are handled as a step for one row.

The control table storage unit 16a in the subdivision processing operation control unit 16 holds the control tables that correspond to all the combinations of the subdivision levels which can be determined by the subdivision level determination unit 13. In the case where the control table storage unit 16a is unable to hold the control tables due to the hardware size or the like, they may be stored in an outside storage apparatus. In that case, when the subdivision level determination unit 13 determines the subdivision level, the corresponding control table is read out of the outside storage apparatus and set for the subdivision processing operation control unit 16.

Next, the procedure for creating a control table will be explained. First, the basic control algorithm for inputting and outputting data into and from a control table will be explained. In the following description, each basic block in the work memory unit 14 is divided into four areas, each of which is referred to as a zone. To be more specific, in WORKMEM [i][j][k], the following is defined:

Zone 0: j=0, 1, 2, 3 k=0, 1, 2, 3
Zone 1: j=3, 4, 5, 6 k=0, 1, 2, 3
Zone 2: j=0, 1, 2, 3 k=3, 4, 5, 6
Zone 3: j=3, 4, 5, 6 k=3, 4, 5, 6

The data stored in the same zone is a set of control points that constitute a single curved surface patch.

The input/output control algorithms for the control table differ according to the following three cases:

(1) Initial state (2) Case where the processing is executed in either the u or v direction (3) Case where the processing is executed in both the u and v directions The explanation of each case will follow.

(1) Initial State

In the initial state, input data is stored in the zone 0 in the basic block number 0, as shown in FIG. 6. Therefore, this data is read and the data of the operation result is again written in the zone 0 in the basic block number 0 for the processing in both directions. In other words, the area in which the input data is stored is overwritten by the newly generated data.

Figures 11A, 11B, 11C:
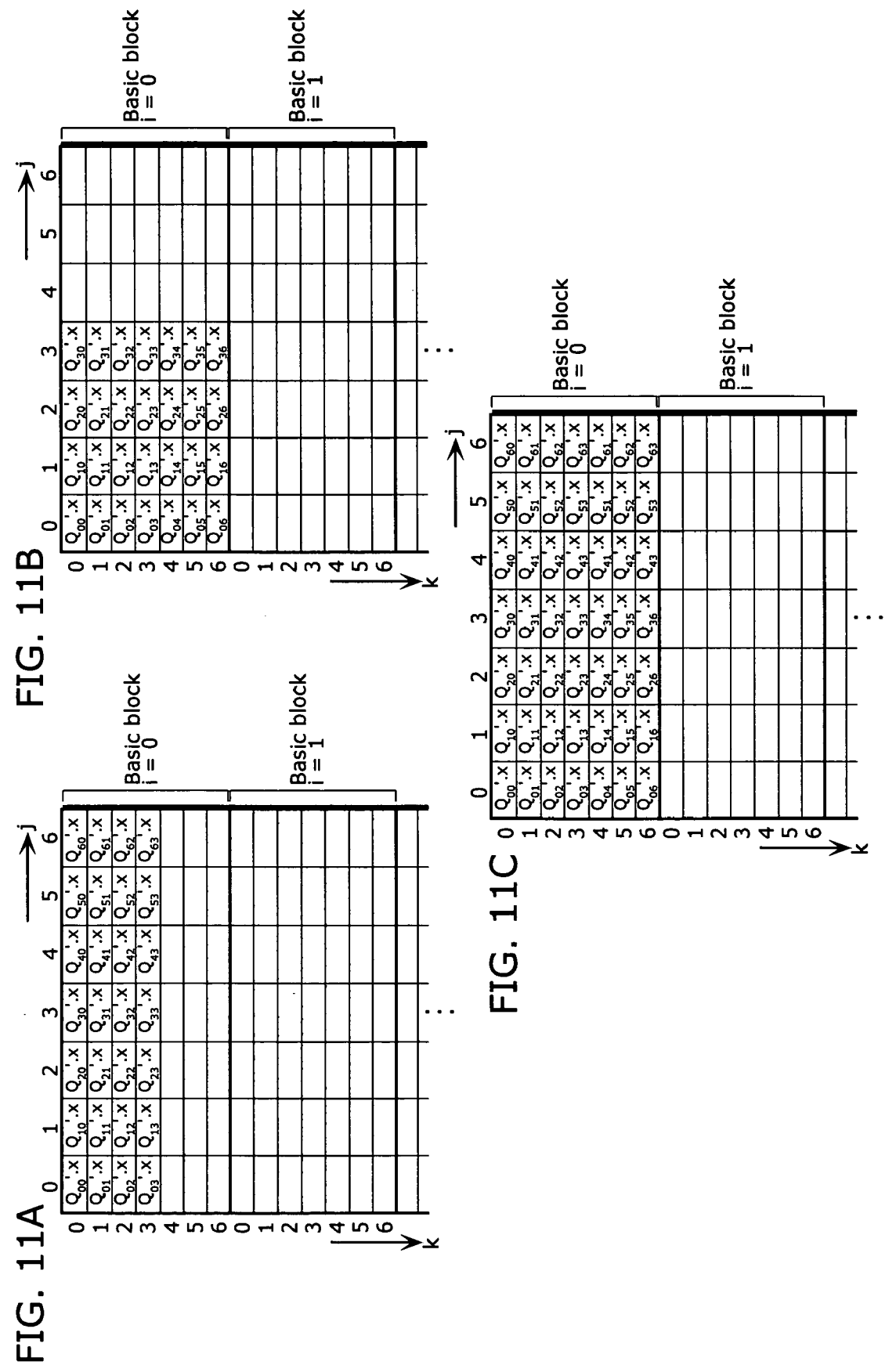

FIG. 11A, FIG. 11B and FIG. 11C show the state of the work memory unit 14 immediately after the subdivision processing is executed once only in the u direction when the work memory unit 14 is in the initial state, the state immediately after the subdivision processing is executed once only in the v direction, and the state immediately after the subdivision processing is executed once in both the u and v directions respectively.

(2) Case where the Processing is Executed in Either the u or v Direction

In the case where the processing is executed in either u or v direction, the result of the processing executed by the subdivision processing operation unit 15 is written into the area of the next basic block number. Therefore, the input/output algorithm in that case is as follows:

(a) Read the data in the basic block number i in the j (or k) direction (b) Write the data generated as a result of the operation into the area in the basic block number (i+1) in the j (or k) direction FIG. 12A and FIG. 12B show the state of the work memory unit 14 before the subdivision processing and the state immediately after the subdivision processing is executed only in the u direction for the data in the zone 0 in the basic block i.

(3) Case where the Processing is Executed in Both the u and v Directions

In the case where the processing is executed in both the u and v directions, the result of the processing in the u direction is written in the area of the next basic block number. Then, the result of the processing in the v direction is written in the area in the same basic block number. Therefore, the area in which the data is stored before the processing in the v direction is overwritten with the newly generated data. The input/output algorithm in that case is as follows:

(a) Read the data in the basic block number i in the j direction (b) Write the data generated as a result of the operation into the area of the basic block (i+1) in the j direction (c) Read the data of the basic block number (i+1) in the k direction (d) Write the data generated as a result of the operation into the area of the basic block (i+1) in the k direction FIG. 13A, FIG. 13B and FIG. 13C show the state of the work memory unit 14 before the subdivision processing, the state immediately after the processing is executed in the u direction for the data in the zone 0 in the basic block i, and the state immediately after the processing is executed in both the u and v directions respectively. In the first embodiment of the present invention, the processing is executed in the u direction first. However, the same algorithm can be used even if the processing is executed in the v direction first.

Next, the basic algorithm for the operation of the subdivision processing will be explained, just for information.

Figure 14A:
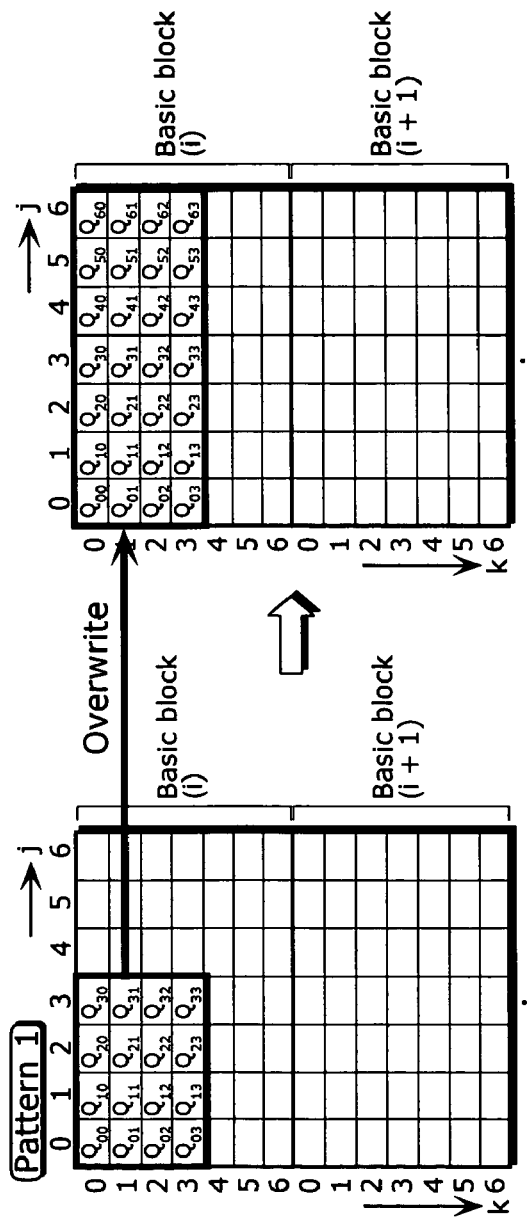
FIGS. 14A and 14B are diagrams for explaining a basic algorithm for the u-direction subdivision by the subdivision processing operation unit.
Figure 14B:
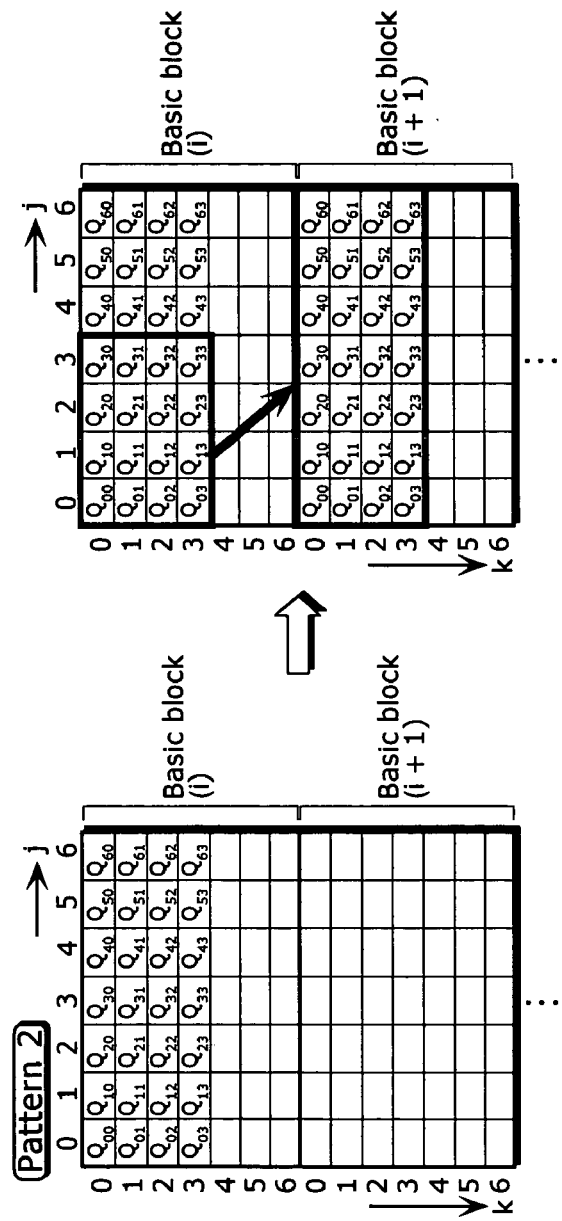

FIGS. 14A and 14B are diagrams for explaining the basic algorithm for the u-direction subdivision processing by the subdivision processing operation unit 15.

When the subdivision processing is executed in the u direction, the resulting data is overwritten in the same basic block in the case where there is free space in the memory area in the j direction, as shown in FIG. 14A. When the subdivision processing is executed in the u direction, the resulting data is written in the next basic block in the case where there is no free space in the j direction, as shown in FIG. 14B.

Figure 15A:
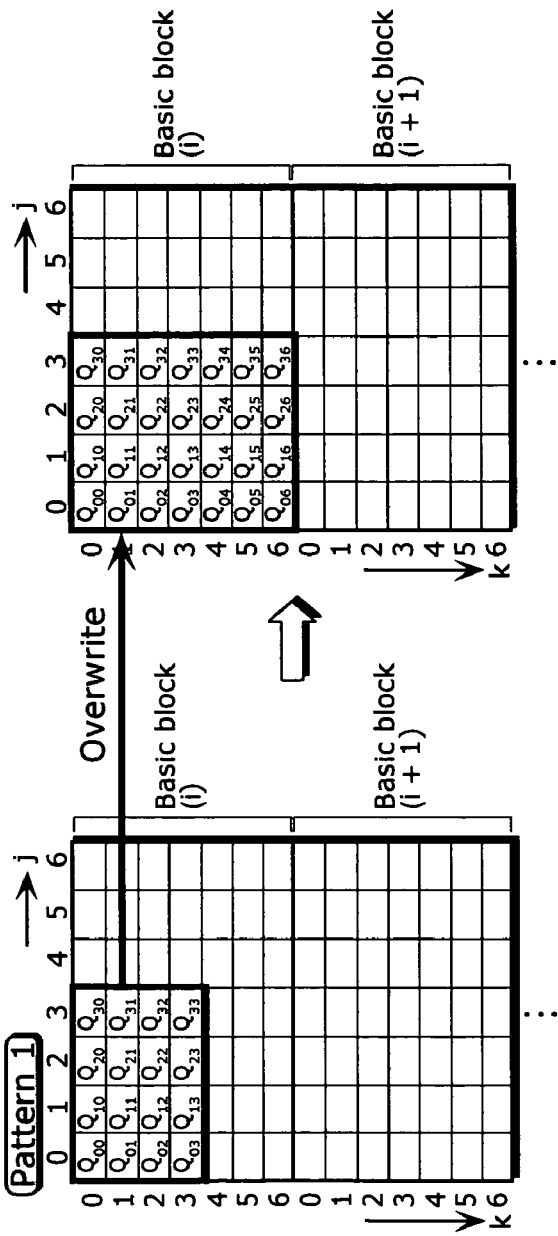
FIGS. 15A and 15B are diagrams for explaining a basic algorithm for the v-direction subdivision by the subdivision processing operation unit.
Figure 15B:
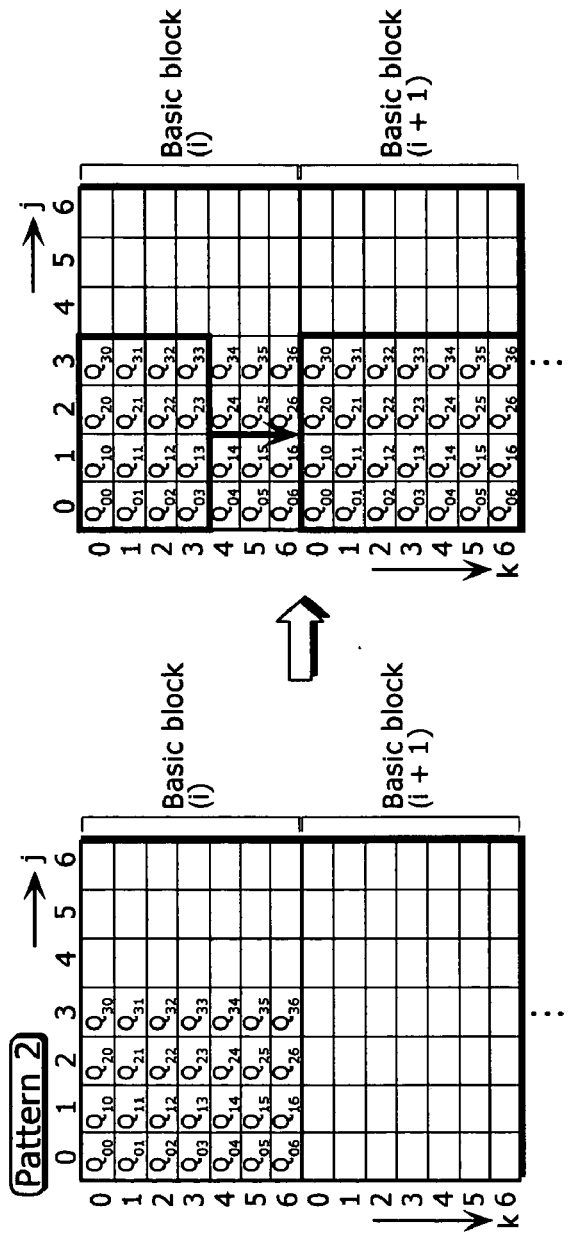

FIGS. 15A and 15B are diagrams for explaining the basic algorithm for the v-direction subdivision processing by the subdivision processing operation unit 15.

In the case where there is free space in the memory area in the k direction, as shown in FIG. 15A, the resulting data is overwritten in the same basic block. In the case where there is no free space in the memory area in the k direction, the resulting data is written in the next basic block.

When the processing of the data which exists in a zone in a current basic block is completed, the data which exists in the next zone in the immediately preceding basic block is inputted in the current basic block. In other words, the control table is structured so that the data stored in each basic block in the work memory unit 14 is processed recursively.

Next, why the control table is created so that the data for the higher level, out of the u direction level and the v direction level, is first processed will be described.

Figure 9A:
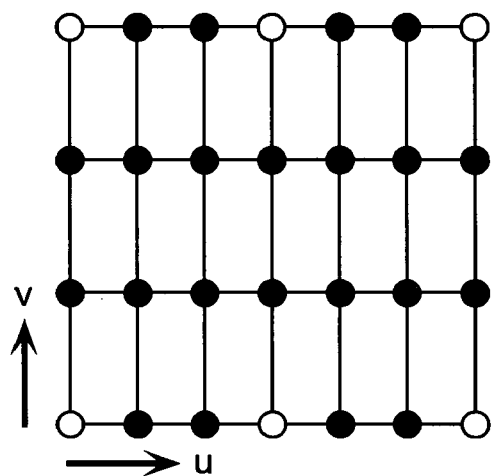
FIG. 9A is a diagram showing a structure of control points generated as a result of level 1 subdivision processing in the u direction only.
Figure 9B:
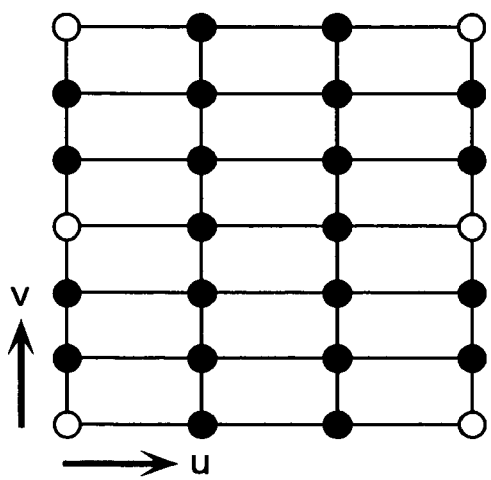
FIG. 9B is a diagram showing a structure of control points generated as a result of level 1 subdivision processing in the v direction only.
Figure 9C:
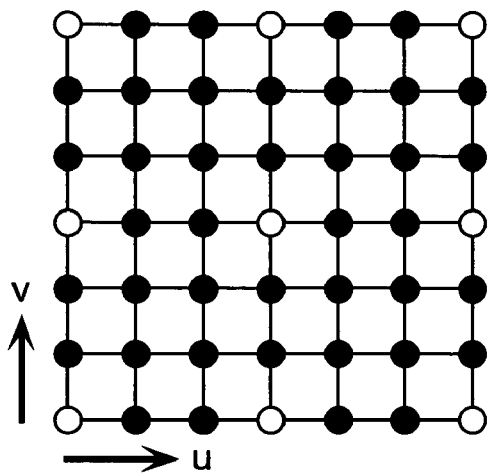
FIG. 9C is a diagram showing a structure of control points generated as a result of level 1 subdivision processing once in the u direction and v direction respectively.

The vertex data which is transferred to the next stage for rendering processing when the subdivision processing is completed can be structured in any of the following three manners:

(a) The number of vertices running in the u direction is larger than the number of vertices running in the v direction (b) The number of vertices running in the v direction is larger than the number of vertices running in the u direction (c) The number of vertices running in the u direction is equal to the number of vertices running in the v direction FIG. 9A, FIG. 9B and FIG. 9C schematically show the structures of the vertices in the above three cases. In these diagrams, black circles indicate vertices which are not located on a Bezier surface, whereas white circles indicate vertices which are located on the surface. In CG, object rendering requires a normal vector for calculating the brightness of each vertex that constitutes the object. Therefore, a normal vector on each vertex located on the surface has also to be calculated in the next stage for rendering the surface. Here, in FIGS. 9A and 9B, six vertices are located on the surface, out of the finally generated vertices. On the other hand, in FIG. 9C, nine vertices are located on the surface. This difference in number of vertices means the difference in number of normal vectors which can be processed collectively in the next stage. Considering that the number of finally generated vertices is kept unchanged if the subdivision level does not change, the cases in FIGS. 9A and 9B are inefficient in calculation of normal vectors because a larger number of normal vectors are calculated repeatedly. Even if a buffer memory for temporally holding the calculated normal vectors is provided in order to avoid the repeated calculations, there occurs a problem that a larger memory size is required. Therefore, it is desirable to output vertex data in the structure of FIG. 9C as much as possible. For this reason, it is necessary, in each control table, to start the subdivision processing in the direction of higher subdivision level first, end the processing in the direction of lower level, and subdivide the surface in the direction opposite to the lower level direction immediately before the last subdivision processing. Therefore, the control table is created so that the subdivision processing in both the u and v directions are executed in the final step. It should be noted here that the processing may be started from either the u direction or the v direction if the subdivision levels in these directions are same.

The control table corresponding to each subdivision level is structured in any of the combinations of the above-mentioned processing. For example, the control table for the u-direction level=2 and the v-direction level=1 is structured so that the processing is executed only in the u direction in the initial state, and then the processing is executed once in the u and v directions respectively. FIG. 10A, FIG. 10B and FIG. 10C are diagrams showing three patterns of the states of the work memory unit 14 when subdivision is executed twice in the u direction and once in the v direction. The pattern 1 for executing the subdivision processing in the directions of u→u→v in this order is most desirable as an output form, because of the number of normals which are calculated repeatedly.

The control table for the u-direction level=1 and the v-direction level=3 is structured so that the processing is executed only in the v direction in the initial state, the processing is executed in the v direction again, and then the processing is executed once in the u and v directions respectively.

Next, the subdivision processing operation control unit 16 interprets the control table which is set for each subdivision level and controls the input and output of data into and from the work memory unit 14. First, the subdivision processing operation control unit 16 interprets the first to third values, starting from the left, in each row of the control table, and determines the top address specifying an area in the work memory unit 14 from which reading of a sequence of the data should be started. Then, the subdivision processing operation control unit 16 reads the fourth value from the left, determines the data reading direction, the j direction or the k direction, and inputs these four pieces of data into the subdivision processing operation unit 15. Then, the subdivision processing operation control unit 16 interprets the fifth to seventh values from the left so as to determine the top address specifying an area in the work memory unit 14 from which writing of a sequence of the data of the operation result should be started, and interprets the eighth value so as to determine the writing direction, the j direction or the k direction. The subdivision processing operation control unit 16 makes the determination of the output addresses for the data calculated by the subdivision processing operation, in parallel with the determination of the input data addresses for the next step, so it is possible to realize high-speed processing.

After completing all the executions of the control table for the X components of the control points that constitute the rational Bezier surface, the subdivision processing operation control unit 16 switches the work memory into the area where the Y components are stored, and starts the execution again from the first row of the control table. After executing the similar processing for the Z and W components, the subdivision processing of the rational Bezier surface is completed.

In the first embodiment, the case where the present invention is applied to an order 4 (or a degree 3) rational Bezier surface has been described. However, in the case where the present invention is applied to an order (n+1) (or a degree n) (n>0) rational Bezier surface, the subdivision processing operation unit 15 is a hardware for accepting the inputs of (n+1) pieces of vertex data and outputting (2n+1) pieces of data. The work memory unit 14 is composed of basic blocks, each of which has (2n+1)×(2n+1) areas.

As described above, according to the curved surface subdivision apparatus in the first embodiment, the subdivision level determination unit 13 first accepts the input of the control points that define the shape of the surface and then determines the subdivision level of each surface patch.

Next, the control table that corresponds to each of the determined subdivision level is set for the subdivision processing operation control unit 16. The subdivision processing operation control unit 16 executes the subdivision processing based on the set control table while controlling the work memory unit 14 and the subdivision processing operation unit 15. The subdivision processing operation unit 15 is structured as a very simple hardware because it does not need to control interpolation coefficients, unlike the conventional techniques.

The curved surface subdivision apparatus in the first embodiment overwrites, starting from the top address, a sequence of the data which has been stored in an area specified by the memory addresses before being processed by the subdivision processing operation unit 15, with a sequence of the data generated as a result of the processing, or uses recursive processing, so efficient use of memory areas is achieved. Therefore, the work memory unit 14 is realized by a memory of a minimum size.

Furthermore, in the control table, the input/output control steps for the work memory unit 14 are described in time sequence. Therefore, the subdivision processing operation control unit 16 does not need to take complex control such as conditional branching.

In addition, the control table is structured so that the processing is executed first in the direction of the higher subdivision level in the case where the u-direction subdivision level is different from the v-direction level. Therefore, it is possible to minimize the number of control points of which normal vectors or the like must be calculated repeatedly. Therefore, it is possible to realize high-speed curved surface subdivision processing even if the u-direction subdivision level is different from the v-direction level.

Second Embodiment

The curved surface subdivision apparatus according to the second embodiment of the present invention will be explained below with reference to the drawings. In the second embodiment, it is possible to control subdivision processing using the same control table for two patterns of subdivision processing: one type where a u-direction subdivision level is α and a v-direction subdivision level is β; and another type where a u-direction subdivision level is β and a v-direction subdivision level is α (namely, the u-direction level and v-direction level are transposed). Therefore, the size of the subdivision processing operation control unit 16 can be reduced.

Figure 16:
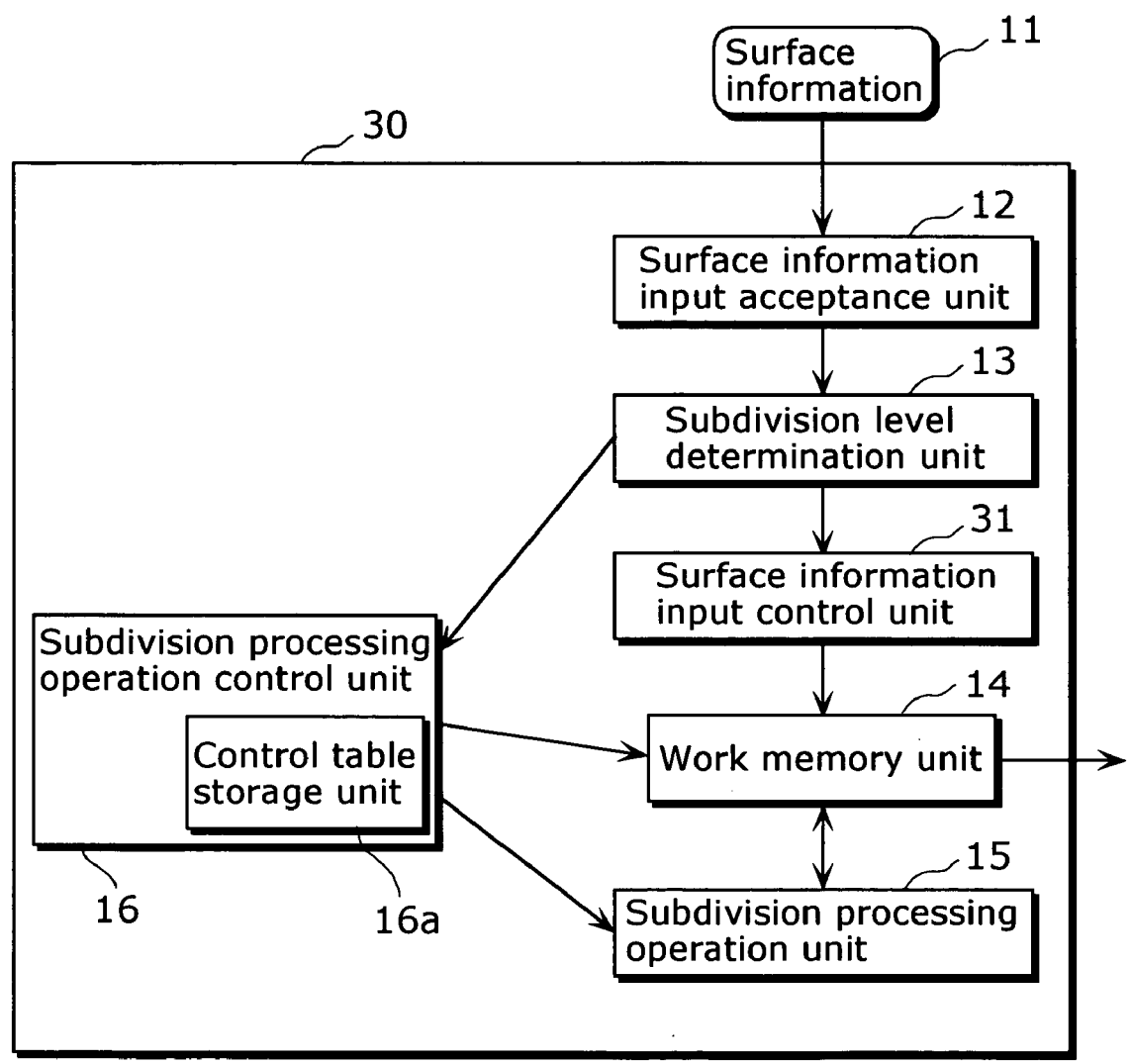
FIG. 16 is a functional block diagram of a curved surface subdivision apparatus in a second embodiment of the present invention.

FIG. 16 is a functional block diagram of the curved surface subdivision apparatus in the second embodiment of the present invention. A curved surface subdivision apparatus 30 as shown in FIG. 16 includes a surface information input control unit 31 in addition to the units as described in the first embodiment. Addition of this surface information input control unit 31 allows reduction of the number of control tables to be stored in the control table storage unit 16a of the subdivision processing operation control unit 16, and thus realizes the curved surface subdivision apparatus 30 as a hardware of a smaller size. The function of each unit will be explained below in detail, but the same numbers are assigned to the same units as described in the first embodiment, and the explanation thereof is not repeated here.

As is the case with the first embodiment, the surface information input acceptance unit 12 accepts the input of the surface information 11. Then, the subdivision level determination unit 13 determines the subdivision level. The determined subdivision level is transferred not only to the subdivision processing operation control unit 16 but also to the surface information input control unit 31. The control point data of each surface patch is temporarily held in the surface information input control unit 31 before being stored in the work memory unit 14.

In the initial state, reading and writing directions from and into the work memory unit 14 for the u-direction subdivision processing are different from those for the v-direction subdivision processing. Therefore, in the above-mentioned first embodiment, two separate control tables for transposed subdivision directions are required respectively for the processing for the u-direction level=2 and the v-direction level=1 and the processing for the u-direction level=1 and the v-direction level=2. So, in the second embodiment, the surface information input control unit 31 controls the order of storing the inputted data into the work memory 14 so that the same control table can be used for the subdivision processing in the transposed subdivision directions.

Figure 17:
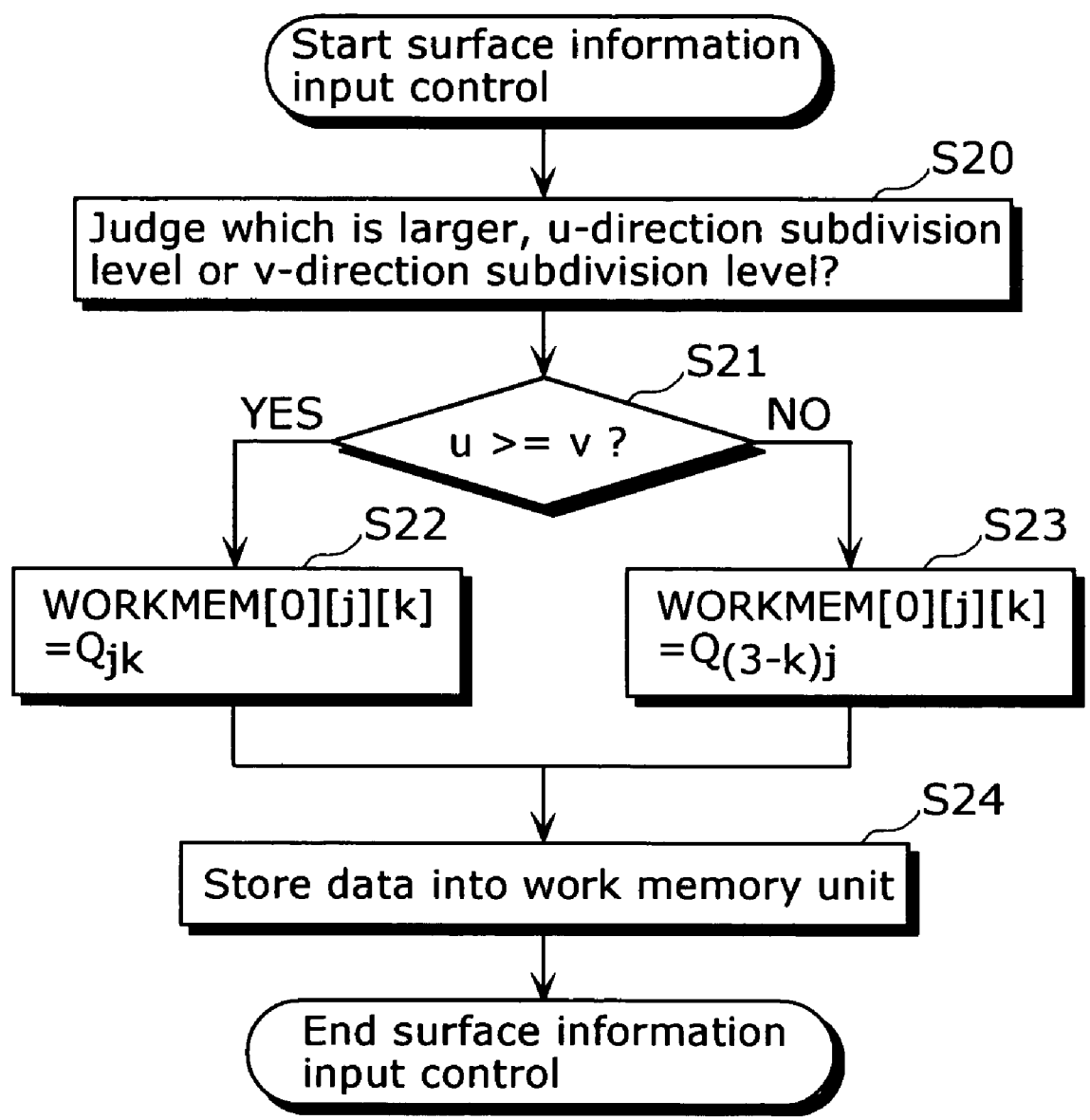
FIG. 17 is a flowchart showing a flow of processing in a curved surface information input control unit.

FIG. 17 is the flowchart showing the flow of the processing in the surface information input control unit 31. First, in Step S20, control point data of a curved surface and the subdivision levels in the u and v directions are inputted, and then it is judged which level is larger, the u direction or the v direction. In the case where the u-direction level is larger than the v direction level or they are equal to each other (YES in Step S21), the control point data is stored so that the following equation holds (Step S22):

WORKMEM [0][j][k]=$Q_{jk}$

In the case where the v-direction level is larger than the u-direction level (NO in Step S21), a sequence of data is stored in a manner where it is turned 90 degrees counterclockwise. Therefore, the following equation holds (Step S23):

WORKMEM [0][j][k]=$Q_{(3-k)j}$

Finally, in Step S24, the data is stored in the work memory unit 14 in the determined order (Step S24). Then, a series of operations for input control of surface information is completed. It should be noted that the operations of the work memory unit 14, the subdivision processing operation unit 15 and the subdivision processing operation control unit 16 are same as those in the above-mentioned first embodiment.

Figure 18:
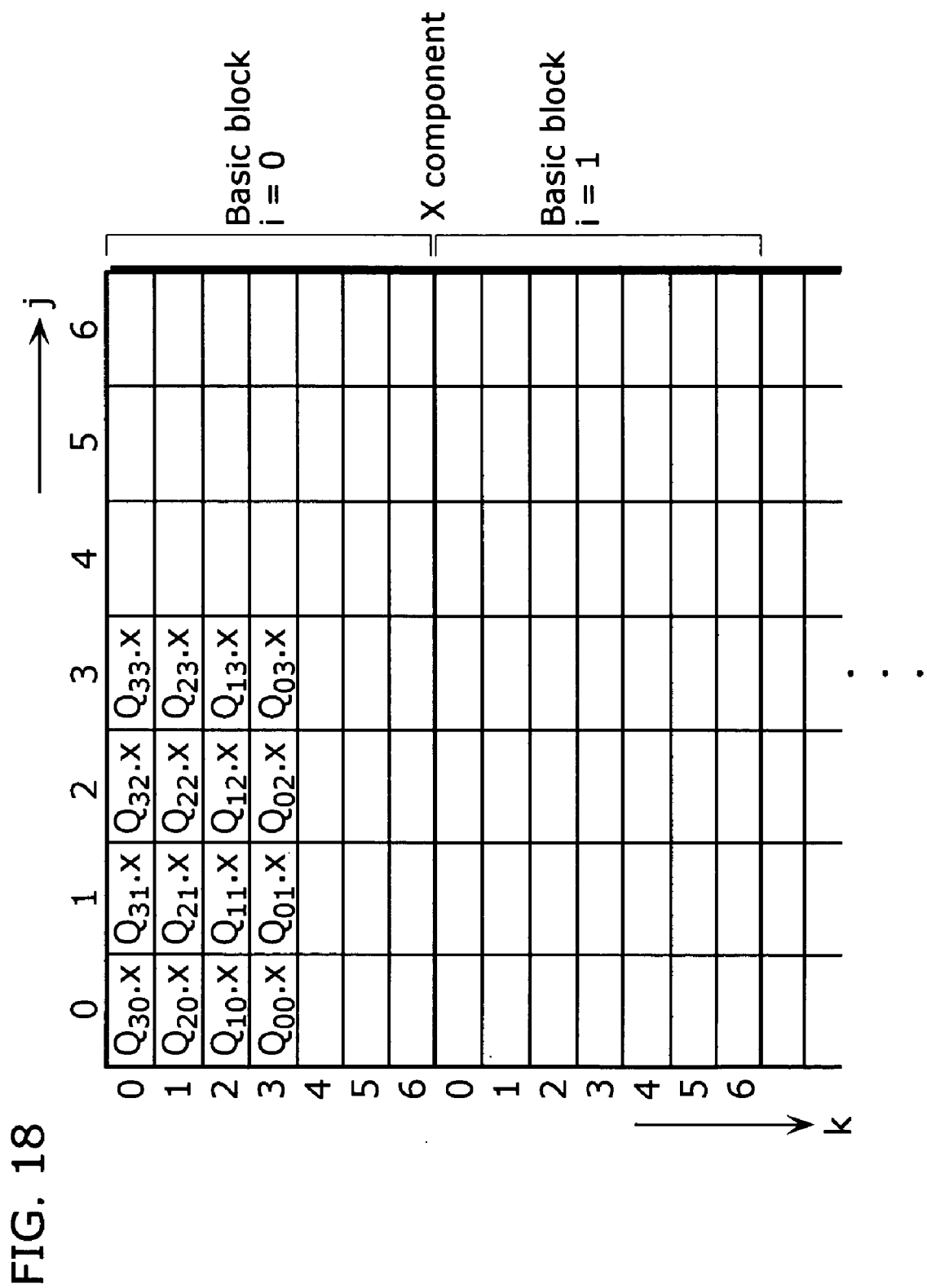
FIG. 18 is a diagram showing a state of the work memory unit immediately after input data is stored in the work memory unit in a case where the v-direction level is larger than the u-direction level.

FIG. 18 shows the state of the work memory unit after the order of storing the control point data into the work memory is changed. In FIG. 18, the control point data stored in the work memory unit 14 in FIG. 6 is re-stored in a manner where the data is turned 90 degrees counterclockwise. Therefore, it is possible, in the two patterns of subdivision processing in which the u-direction subdivision level and v-direction subdivision level are transposed, to specify the memory addresses of the work memory, using the same control table.

FIG. 19A and FIG. 19B show, as a reference, control tables for two patterns of subdivision processing in which the u-direction level and v-direction level are transposed.

As shown in FIGS. 19A and 19B, when comparing the control table for the u-direction subdivision level=2 and the v-direction subdivision level=1 and the control table for the u-direction level=1 and the v-direction=2, they differ from each other in the following three points:

(1) Basic block number i is kept unchanged;
(2) As for the column j and column k, values are transposed for both INPUT and OUTPUT; and
(3) As for the reading and writing directions indicated in the column D, j and k are transposed.

As a result, the control table is rewritten by the subdivision processing operation control unit 16 using the above (1) to (3), and thus the capacity of the control table which is to be stored in the control table storage unit 16a can be reduced.

As described above, the curved surface subdivision apparatus in the second embodiment includes the surface information input control unit 31 for controlling the order of storing a sequence of the control point data into the work memory unit 14 based on the result of the comparison between the u-direction subdivision level and the v-direction subdivision level.

As a result, it is possible to execute two patterns of subdivision processing in which the u-direction subdivision level and the v-direction subdivision level are transposed, using the same control table. Therefore, the total size of the control tables are reduced, and thus the size of the subdivision processing operation control unit 16 can be reduced.

Third Embodiment

Next, the curved surface subdivision apparatus in the third embodiment of the present invention will be explained with reference to the drawings. In the third embodiment, the curved surface subdivision apparatus includes a polygon generation unit for curbing a significant increase in the number of polygons by controlling polygon constructions using control points located on a surface.

Figure 20:
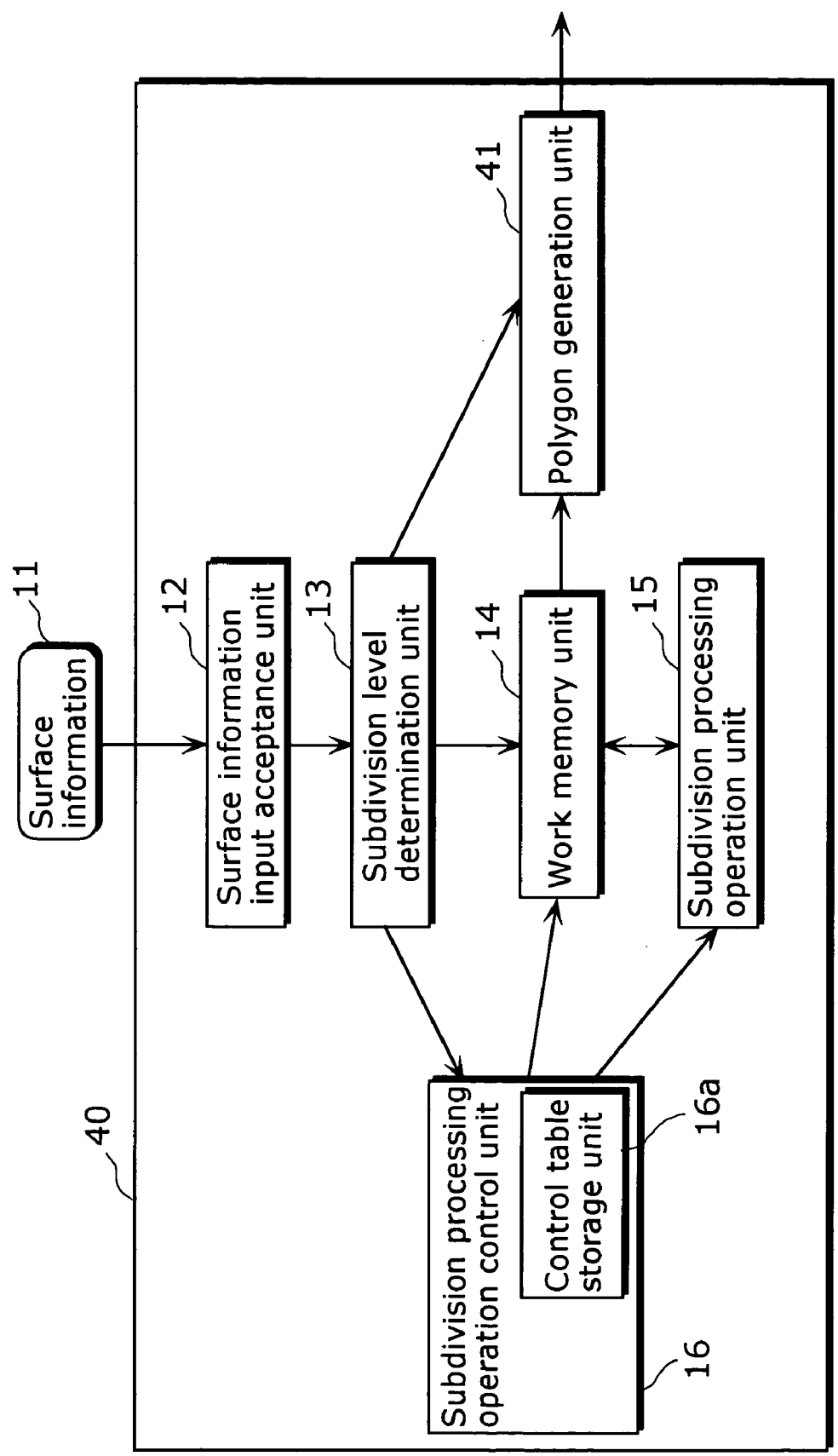
FIG. 20 is a functional block diagram of a curved surface subdivision apparatus in a third embodiment of the present invention.

FIG. 20 is a functional block diagram of the curved surface subdivision apparatus in the third embodiment. A curved surface subdivision apparatus 40 as shown in FIG. 20 includes a polygon generation unit 41 in addition to the units as described in the first embodiment. The function of each unit will be explained below in detail, but the same numbers are assigned to the same units as described in the first embodiment, and the explanation thereof is not repeated here.

FIG. 21A to FIG. 21E show, as a reference, various types of polygonal approximations made by the polygon generation unit 41.

Figure 21E:
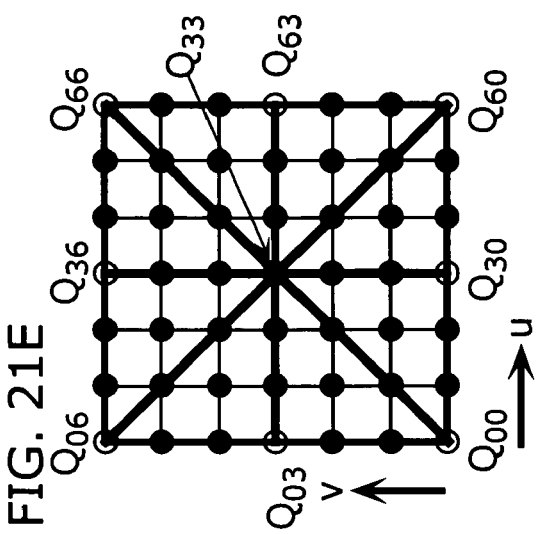
FIG. 21E is a diagram showing another method of connecting control points for polygon generation.
Figure 21B:
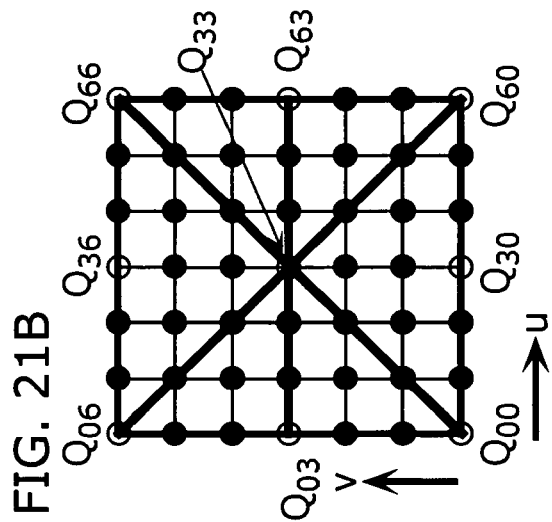
FIG. 21B is a diagram showing a method of constructing polygons in the case where only the u-direction level is a mid-level.
Figure 21D:
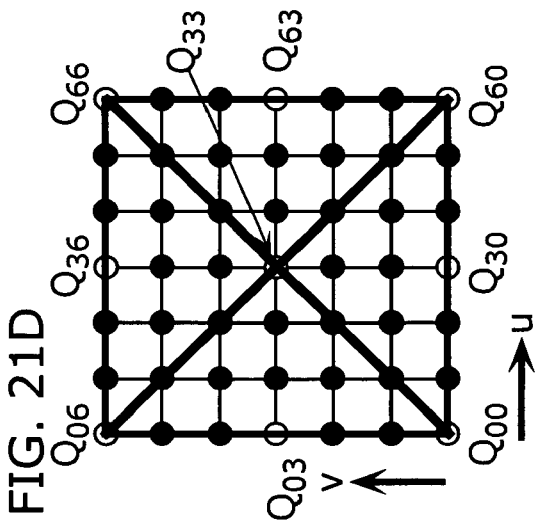
FIG. 21D is a diagram showing a method of constructing polygons in the case where both the u and v direction levels are mid-levels.
Figure 21A:
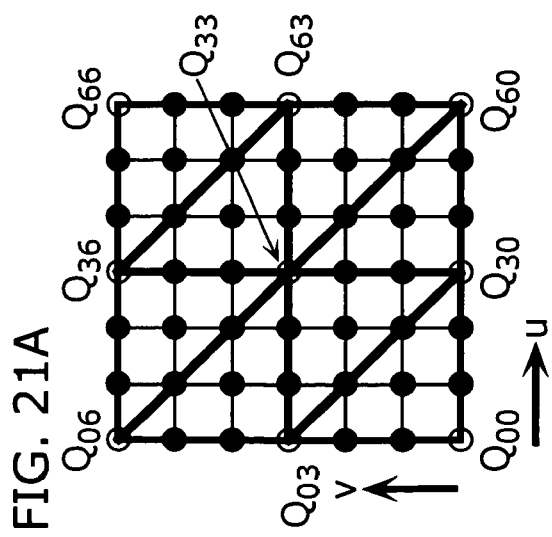
FIG. 21A is a diagram showing a method of constructing polygons using vertices generated as a result of subdivision processing in the case where the subdivision levels are integers.

In rendering a curved surface using subdivision processing, polygonal approximation is usually made by connecting vertices located on a Bezier surface out of generated control points. For example, when vertex data as shown in FIG. 9C is obtained, a surface patch is divided into eight triangle polygons, as shown in FIG. 21A. When subdivision processing is executed once in the u and v directions respectively, a surface patch is divided into four subpatches (See FIG. 4). In other words, one subdivision processing in respective u and v directions quadruples the number of finally generated polygons, and the number of polygons increases at an accelerated rate as the subdivision level is raised.

Therefore, the subdivision level determination unit 13 is structured so as to determine mid-levels (in increments of 0.5) in addition to the subdivision levels in increments of an integer (1) as described above. A subdivision level with its decimal part being not 0 will be hereinafter referred to as a mid-level.

For example, in the case where subdivision levels are determined depending on distances from a viewpoint of an object (a surface patch), a table in which finer subdivision levels (mid-levels) are set, as shown in FIG. 22, can be used. In the case where the subdivision levels in the u and v directions are determined depending on distances between control points, a similar table in which the mid-levels are set can be used. The determined subdivision level is transferred not only to the subdivision processing operation control unit 16 but also to the polygon generation unit 41.

In the case where the determined subdivision level is a mid-level, the subdivision processing operation control unit 16 sets a control table that corresponds to the level indicated by an integer of a value obtained by adding 1 to the integer part of the mid-level. For example, when the determined u-direction subdivision level is 2.5 and v-direction subdivision level is 1.5, the subdivision processing operation control unit 16 sets a control table that corresponds to the level 3 for the u direction and the level 2 for the v direction.

The subdivision processing operation control unit 16 executes the subdivision processing while controlling the work memory unit 14 and the subdivision processing operation unit 15 based on the set control table. Except for the case where either the u-direction level or the v-direction is 0, a surface patch is finally generated in the form as shown in FIG. 9C.

Figure 21C:
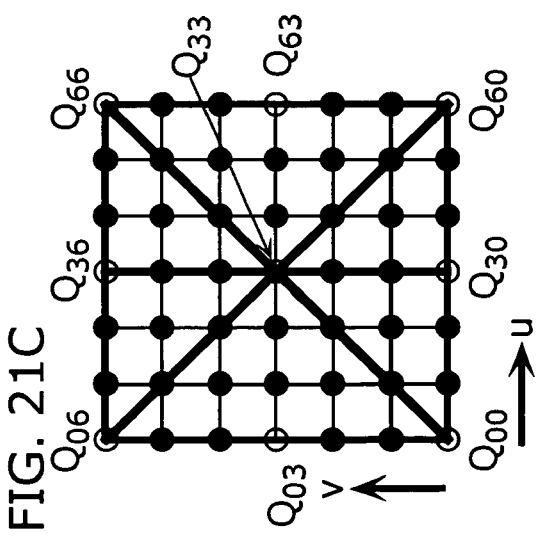
FIG. 21C is a diagram showing a method of constructing polygons in the case where only the v-direction level is a mid-level.

The polygon generation unit 41 judges whether or not the subdivision level is a mid-level or not. In the case where it is not a mid-level, the polygon generation unit 41 generates eight polygons by connecting the vertices $Q_{00}$, $Q_{30}$, $Q_{60}$, $Q_{03}$, $Q_{33}$, $Q_{63}$, $Q_{06}$, $Q_{36}$ and $Q_{66}$ which are located on the surface, as shown in FIG. 21A. Next, in the case where only the u-direction level is a mid-level, the polygon generation unit 41 generates six polygons not using the vertices $Q_{30}$ and $Q_{36}$ but using the vertices $Q_{00}$, $Q_{60}$, $Q_{03}$, $Q_{33}$, $Q_{63}$, $Q_{06}$ and $Q_{66}$ only, out of the vertices located on the surface, as shown in FIG. 21B. On the other hand, in the case where only the v-direction level is a mid-level, the polygon generation unit 41 generates six polygons not using the vertices $Q_{03}$ and $Q_{63}$ but using the vertices $Q_{00}$, $Q_{30}$, $Q_{60}$, $Q_{33}$, $Q_{06}$, $Q_{36}$ and $Q_{66}$ only, as shown in FIG. 21C. In the case where both the u-direction and v-direction subdivision levels are mid-levels, the polygon generation unit 41 generates four polygons not using $Q_{30}$, $Q_{03}$, $Q_{63}$ and $Q_{36}$ but using $Q_{00}$, $Q_{60}$, $Q_{33}$ $Q_{06}$ and $Q_{66}$, as shown in FIG. 21D. These connections of vertices as shown in FIGS. 21A to 21D are just examples, and the present invention is not limited to them. In the case where either the u-direction subdivision level or the v-direction subdivision level is 0, the polygon generation unit 41 generates four polygons by connecting all the vertices located on the surface, regardless of whether the level is a mid-level or not, because the surface patch is finally generated in the form as shown in FIG. 9A or FIG. 9B. FIG. 21E is a diagram showing still another connection of control points for polygon generation. In FIG. 21E, in the case where both the u-direction and v-direction subdivision levels are integers, polygons are generated using all the control points generated by the subdivision processing.

As described above, according to the curved surface subdivision apparatus in the third embodiment of the present invention, it is possible for the subdivision level determination unit 13 to determine the values of mid-levels which are not integers, and thus, for the polygon generation unit 41 to generate polygons in various manners, based on its own judgment of whether the subdivision level is a mid-level or not.

As mentioned above, a smoother surface can be represented as the number of polygons increases. According to the curved surface subdivision apparatus in the present embodiment, it is possible to prevent increase in an operation amount for polygon generation caused by too much increase in polygons, and thus control subdivision levels more flexibly without increasing control programs. It is also possible to curb the sharp increase in the number of polygons due to subdivision processing.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The curved surface subdivision apparatus according to the present invention can be used, in the field of 3D computer graphics, as a curved surface subdivision apparatus for subdivision and polygon generation when rendering a smooth 3D object using freeform surfaces such as Bezier surfaces and NURBS surfaces. For example, this curved surface subdivision apparatus can be applied to personal digital assistants, car navigation apparatuses and entertainment apparatuses such as hand-held game machines and televisions, which display 3D objects on the screens.

What is claimed is:

1. A curved surface subdivision apparatus comprising:
a subdivision level determination unit operable to determine the number of subdivisions for a curved surface;
a work memory unit operable to hold control point information that defines a shape of the surface, as well as an intermediate result and a final result of a series of subdivision processing;
a subdivision processing operation unit operable to read first control point information from the work memory unit, generate second control point information, and write the second control point information into the work memory unit, said first control point information being control point information about a sequence of control points that align in one of a first axis direction and a second axis direction of the surface before the subdivision processing, said second control point information being control point information about a sequence of control points which are newly generated as a result of the subdivision processing; and
an operation control unit operable to determine first memory addresses and second memory addresses, said first memory addresses specifying an area of the work memory unit where the first control point information is stored, said second memory addresses specifying an area of the work memory unit where the second control point information is to be stored;
wherein the subdivision processing operation unit writes, under control of the operation control unit, the second control point information into the area of the work memory unit specified by the second memory addresses, over the first control point information which is stored in the area of the work memory unit specified by the first memory addresses, said first memory addresses being a subset of said second memory addresses, and wherein the operation control unit compares the respective numbers of subdivisions in the first axis direction and the second axis direction of the surface, and controls an operation of the subdivision processing operation unit so that the last subdivision processing is executed in one of the first and second axis directions with a smaller number of subdivisions, and the immediately preceding subdivision processing is executed in the other one of the axis directions.

2. The curved surface subdivision apparatus according to claim 1, wherein in the case where the subdivision processing is executed first in one of the first and second axis directions of the surface with a larger number of subdivisions and then the subdivision processing is executed in the axis direction of said surface with a smaller number of subdivisions, the operation control unit further determines the second memory addresses of the work memory unit so that the second control point information, which is generated as a result of the subdivision processing in the axis direction with the smaller number of subdivisions, is written over the first control point information which is stored in the area specified by the first memory addresses before said subdivision processing in the axis direction with the smaller number of subdivisions.

3. The curved surface subdivision apparatus according to claim 1, wherein the operation control unit further determines the first memory addresses and the second memory addresses in the work memory unit so as to process recursively the control point information that is generated in sequence by the subdivision processing.

4. The curved surface subdivision apparatus according to claim 1, wherein the operation control unit further compares the respective numbers of subdivisions in the first axis direction and the second axis direction of the surface, and controls an operation of the subdivision processing operation unit so that the subdivision processing is started in one of the axis directions with a larger number of subdivisions.

5. The curved surface subdivision apparatus according to claim 1, wherein the operation control unit further compares the respective numbers of subdivisions in the first axis direction and the second axis direction of the surface, calculates a difference value by subtracting a smaller number of subdivisions from a larger number of subdivisions, and controls an operation of the subdivision processing operation unit so that the subdivision processing is executed in one of the first and second axis directions with the larger number of subdivisions in succession by the number of times of the difference value.

6. The curved surface subdivision apparatus according to claim 1, further comprising a control table holding unit operable to hold a control table in which the first memory addresses and the second memory addresses of the work memory unit are described in order of the series of subdivision processing throughout said processing for combinations of the respective numbers of subdivisions in the first and second axis directions, wherein the operation control unit determines the first memory addresses and the second memory addresses with reference to the control table, and wherein in the case where the numbers of subdivisions in the first axis direction and the second axis directions are transposed, the operation control unit designates the first memory addresses and the second memory addresses for the subdivision processing operation unit with reference to the same control table.

7. The curved surface subdivision apparatus according to claim 6, further comprising a surface information input control unit operable to control an order of storing the control point information into the work memory unit, according to the respective numbers of subdivisions in the first axis direction and the second axis direction.

8. The curved surface subdivision apparatus according to claim 7, wherein in the case where the number of subdivisions in the first axis direction is equal to or larger than the number of subdivisions in the second axis direction, the surface information input control unit stores the control point information into the work memory unit starting from the top address, in one of the following orders: in ascending order of indices which are assigned respectively to the control point information in the second axis direction; and in ascending order of indices which are assigned respectively to the control point information in the first axis direction when the indices for the second axis direction are same as the indices for the first axis direction, and wherein in the case where the number of subdivisions in the second axis direction is larger than the number of subdivisions in the first direction, the surface information input control unit stores the control point information into the work memory unit starting from the top address, in one of the following orders: in descending order of the indices which are assigned respectively to the control point information in the first axis direction; and in ascending order of the indices which are assigned respectively to the control point information in the second axis direction when the indices for the first axis direction are same as the indices for the second axis direction.

9. The curved surface subdivision apparatus according to claim 6, wherein in the case where the subdivision processing operation unit executes the subdivision processing using the control table in which the numbers of subdivisions in the first axis direction and the second axis direction are transposed, the surface information input control unit rewrites the control table, and the subdivision processing operation unit executes the subdivision processing using the rewritten control table.

10. The curved surface subdivision apparatus according to claim 9, wherein the surface information input control unit rewrites the control table by transposing not only columns of input data and output data, except for basic block numbers, but also columns of a reading direction and a writing direction.

11. The curved surface subdivision apparatus according to claim 1, wherein the subdivision level determination unit sets, for the subdivision processing operation unit, the number of subdivisions of which value is not an integer, wherein the curved surface subdivision apparatus further comprises:

a control point selection unit operable to select control points used for generation of a polygon by judging whether the number of subdivisions set for the subdivision processing operation unit is an integer value or a value with 0.5; and a polygon generation unit operable to generate the polygon using the control points selected by the control point selection unit, wherein the control point selection unit selects all of control points which are located on the surface, when judging that the numbers of subdivisions in both the first and second axis directions are integer values, and wherein the polygon generation unit generates the polygon by connecting the neighboring control points selected by the control point selection unit.

12. The curved surface subdivision apparatus according to claim 11, wherein in the case where the number of subdivisions in only one of the first axis direction and the second axis direction is a value with 0.5, the control point selection unit selects the following control points out of the control points which are located on the surface: control points which are located on four corners of the surface; control points which are not located on an edge of the surface; and control points which are located on an edge in the axis direction in which number of subdivisions is not a value with 0.5, and wherein the polygon generation unit generates the polygon by connecting the neighboring control points selected by the control point selection unit.

13. The curved surface subdivision apparatus according to claim 11, wherein in the case where the numbers of subdivisions in both the first axis direction and the second axis direction are values with 0.5, the control point selection unit selects the following control points out of the control points which are located on the surface: control points which are located on four corners of the surface; and control points which are not located on an edge of the surface, and wherein the polygon generation unit generates the polygon by connecting the neighboring control points selected by the control point selection unit.

14. The curved surface subdivision apparatus according to claim 11, wherein in the case where the surface is a rectangle and the numbers of subdivisions in both the first axis direction and the second axis direction are values with 0.5, the control point selection unit selects the following control points out of the control points which are located on the surface: control points which are located on four corners of the surface; and control points which are not located on an edge of the surface, and wherein the polygon generation unit generates the polygon by connecting the control points which are not located on the edge of the surface and the control points which are located on the four corners of the surface.

15. A curved surface subdivision method comprising:

a subdivision level determination step of determining the number of subdivisions for a curved surface;

a subdivision processing operation step of reading first control point information from a work memory unit, generating second control point information, and writing the second control point information into the work memory unit, said work memory unit holding control point information that defines a shape of the surface, as well as an intermediate result and a final result of a series of subdivision processing, said first control point information being control point information about a sequence of control points that align in one of a first axis direction and a second axis direction of the surface before the subdivision processing, and said second control point information being control point information about a sequence of control points which are newly generated as a result of the subdivision processing; and an operation control step of determining first memory addresses and second memory addresses, said first memory addresses specifying an area of the work memory unit where the first control point information is stored, said second memory addresses specifying an area of the work memory unit where the second control point information is to be stored;

wherein in the subdivision processing operation step, the second control point information is written, under control of the operation control step, into the area of the work memory unit specified by the second memory addresses, over the first control point information which is stored in the area of the work memory unit specified by the first memory addresses, said first memory addresses being a subset of said second memory addresses, and wherein in the operation control step, the respective numbers of subdivisions in the first axis direction and the second axis direction of the surface are compared, and an operation in the subdivision processing operation step is controlled so that the last subdivision processing is executed in one of the first and second axis directions with a smaller number of subdivisions, and the immediately preceding subdivision processing is executed in the other one of the axis directions.

16. A program embodied on a medium, the program causing a computer to execute:

a subdivision level determination step of determining the number of subdivisions for a curved surface;

a subdivision processing operation step of reading first control point information from a work memory unit, generating second control point information, and writing the second control point information into the work memory unit, said work memory unit holding control point information that defines a shape of the surface, as well as an intermediate result and a final result of a series of subdivision processing, said first control point information being control point information about a sequence of control points that align in one of a first axis direction and a second axis direction of the surface before the subdivision processing, and said second control point information being control point information about a sequence of control points which are newly generated as a result of the subdivision processing; and an operation control step of determining first memory addresses and second memory addresses, said first memory addresses specifying an area of the work memory unit where the first control point information is stored, said second memory addresses specifying an area of the work memory unit where the second control point information is to be stored;

wherein in the subdivision processing operation step, the second control point information is written, under control of the operation control step, into the area of the work memory unit specified by the second memory addresses, over the first control point information which is stored in the area of the work memory unit specified by the first memory addresses, said first memory addresses being a subset of said second memory addresses, and wherein in the operation control step, the respective numbers of subdivisions in the first axis direction and the second axis direction of the surface are compared, and an operation in the subdivision processing operation step is controlled so that the last subdivision processing is executed in one of the first and second axis directions with a smaller number of subdivisions, and the immediately preceding subdivision processing is executed in the other one of the axis directions.

* * * * *